(12) United States Patent
Sagisaka et al.

(10) Patent No.: US 6,740,375 B1
(45) Date of Patent: May 25, 2004

(54) FLUOROCHEMICAL ADHESIVE MATERIAL AND LAMINATE COMPRISING THE SAME

(75) Inventors: Shigehito Sagisaka, Settsu (JP); Taketo Kato, Settsu (JP); Takeshi Inaba, Settsu (JP); Takuya Arase, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/070,669

(22) PCT Filed: Sep. 8, 2000

(86) PCT No.: PCT/JP00/06126

§ 371 (c)(1),
(2), (4) Date: May 8, 2002

(87) PCT Pub. No.: WO01/18142

PCT Pub. Date: Mar. 15, 2001

(30) Foreign Application Priority Data

Sep. 8, 1999 (JP) ............................................. 11/254208

(51) Int. Cl.⁷ ................................................. B32B 27/30
(52) U.S. Cl. ...................... 428/35.7; 428/420; 428/421; 428/422
(58) Field of Search ............................... 428/35.7, 420, 428/421, 422

(56) References Cited

U.S. PATENT DOCUMENTS

| 3,817,951 A | 6/1974 | Robinson | 260/80.77 |
| 4,338,237 A | 7/1982 | Sulzbach et al. | 524/777 |
| 4,381,387 A | 4/1983 | Sulzbach | 526/247 |
| 4,916,020 A | 4/1990 | Golding et al. | 428/421 |
| 5,736,610 A | 4/1998 | Nishi et al. | 525/276 |
| 5,965,275 A | 10/1999 | Nishi et al. | 428/475.8 |
| 6,165,575 A | 12/2000 | Nishi et al. | 428/36.9 |

FOREIGN PATENT DOCUMENTS

| EP | 0 199 991 | 5/1986 |
| EP | 0 457 255 A2 | 11/1991 |
| EP | 601754 A1 | 6/1994 |
| EP | 0 601 754 A1 | 6/1994 |
| EP | 0 866 108 A1 | 9/1998 |
| GB | 1 384 398 | 2/1975 |
| JP | 52 073994 | 6/1977 |
| JP | 54 031492 | 3/1979 |
| JP | 55 089311 | 7/1980 |
| JP | 56 095926 | 8/1981 |
| JP | 61 159410 | 7/1986 |
| JP | 6 322028 | 11/1994 |
| JP | 6322336 | 11/1994 |
| JP | 6-322336 A | 11/1994 |
| JP | 7018035 | 1/1995 |
| JP | 7025952 | 1/1995 |
| JP | 7025954 | 1/1995 |
| JP | 7 228848 | 8/1995 |
| JP | 8 41131 | 2/1996 |
| WO | 98/58973 A1 | 12/1998 |
| WO | WO98 58973 | 12/1998 |

*Primary Examiner*—Sandra M. Nolan
(74) *Attorney, Agent, or Firm*—Birch, Stewart, Kolasch & Birch, LLP

(57) ABSTRACT

A fluorine-containing adhesive material comprising a fluorine-containing ethylenic polymer having a carbonate group and/or a carboxylic acid halide group at a chain end or a side chain of the polymer, wherein a total of a number of the carbonate groups and/or carboxylic acid halide groups is at less than 150 per $1\times10^6$ main chain carbon atoms, can directly impart the firm adherability to a substrate such as a metal, a glass or a resin while maintaining excellent properties such as chemical resistance, solvent resistance, weatherability and soil releasability possessed by a fluorine-containing polymer.

36 Claims, No Drawings

FLUOROCHEMICAL ADHESIVE MATERIAL AND LAMINATE COMPRISING THE SAME

This application is the national phase under 35 U.S.C. § 371 of PCT International Application No. PCT/JP00/06126 which has an International filing date of Sep. 8, 2000, which designated the United States of America.

FIELD OF THE INVENTION

The present invention relates to a fluorine-containing adhesive material which can firmly adhere to various substrates comprising an organic material such as various synthetic resins or an inorganic material such as glass and metal. The present invention also relates to a laminate and a shaped article comprising the same as well as a process for producing the shaped article.

RELATED ART

A fluorine-containing polymer has hitherto been used in many uses since it is excellent in heat-resistance, chemical resistance, weatherability, surface properties (a low frictional property and the like), and electrical insulation. Because, particularly in view of solvent resistance, the fluorine-containing polymer is insoluble in most of solvents and has high resistance to impregnation and penetration of solvents, the fluorine-containing polymer is widely used for a tube or a pipe lining for transportation of fuels, paints and chemical liquids.

On the other hand, a fluorine-containing polymer is generally insufficient in the mechanical strength and dimensional stability, and is expensive.

Then, in order to utilize the advantages of a fluorine-containing polymer to a maximum degree and minimize the defects, it has been extensively studied to develop a composite such as adhesion or lamination between the fluorine-containing polymer and other organic materials or inorganic materials.

However, it is difficult to adhere a fluorine-containing polymer directly to other materials. Even when the adhesion was tried with heat fusing, the adhesion strength was insufficient and, even if adhered to some extent, the adhesion strength was widely varied, which frequently resulted in the insufficient reliance on the adherability.

As a method for adhering a fluorine-containing polymer to other materials, (1) a method for physically roughing with a sandblaster treatment a surface of a shaped article comprising one or both materials, (2) a method of subjecting a shaped article formed from a fluorine-containing polymer to a surface treatment such as sodium etching, plasma treatment and photochemical treatment, and (3) a method of adhesion with an adhesive have been mainly studied. However, regarding the above-mentioned (1) and (2), a treating step is necessary and, additionally, the productivity is low due to the complicated step. In addition, a type and shape of a substrate are restricted. A problem on appearance of the resultant laminate (coloration and flaw) easily arises. Further, even if these treatments are conducted, significant improvement of adhesion strength cannot obtained.

The study on the adhesive described in the above-mentioned (3) has been variously conducted. Generally used adhesives based on hydrocarbon materials have the insufficient adherability, and laminates comprising these adhesives have an adhesive layer insufficient in heat resistance, chemical resistance and water resistance. Accordingly, the adhesion strength can not be retained by a change in temperature and a change in circumstances, leading to the lack of reliance. In addition, it is difficult to impart to the laminates the above-mentioned excellent properties possessed by the fluorine-containing polymer.

On the other hand, the adhesion with an adhesive or an adhesive composition comprising a fluorine-containing polymer having a functional group has been studied.

For example, there are a report on the use of, as an adhesive, a fluorine-containing polymers obtained by graft-polymerization of a fluorine-containing polymer with a hydrocarbon monomer having a carboxyl group, a carboxylic anhydride residue group, an epoxy group, or a hydrolyzable silyl group, such as maleic anhydride and vinyl trimethoxysilane (for example, JP-A-7-18035 (18035/1995), JP-A-7-25952 (25952/1995), JP-A-7-25954 (25954/1995), JP-A-7-173230 (173230/1995), JP-A-7-173446 (173446/1995) and JP-A-7-173447 (173447/1995)), and a report in which an adhesive composition comprising a fluorine-containing copolymer obtained by copolymerizing a hydrocarbon monomer containing a functional group such as a hydroxylalkyl vinyl ether with tetrafluoroethylene or chlorotrifluoroethylene, and an isocyanate curing agent are used as an adhesive between a vinyl chloride polymer and ETFE (an ethylene/tetrafluoroethylene polymer) treated with corona discharge (for example, JP-A-7-228848 (228848/1995)).

The adhesive or adhesive composition comprising a fluorine-containing polymer obtained by graft-polymerizing or copolymerizing a hydrocarbon functional group-containing monomer does not have sufficiently improved heat-resistance so that degradation and foaming are caused at the use of an elevated temperature, leading to decrease in the adhesion strength, peeling or coloration. In the case of using the above-mentioned adhesive composition described in the JP-A-7-228848 (228848/1995), the fluororesin (ETFE) uneconomically requires the previously conducted corona discharge treatment.

In addition, it is reported that a fluorine-containing polymer having a functional group obtained by copolymerizing a perfluorovinylether compound containing arboxylic acid or its derivative with a fluorine-containing monomer is used as an adhesive or an adhesive composition. U.S. Pat. No. 4,916,020 discloses a laminate comprising a fluorine-containing polymer having a functional group introduced by copolymerizing perfluorovinylether having carboxylic acid group or its derivative with tetrafluoroethylene and the like.

However, this is a laminate in which the aforementioned fluorine-containing polymer having carboxylic acid group or the like is laminated on a metal or the other substrate via an adhesive resin such as an epoxy resin and a urethane resin and not a laminate in which the polymer is directly adhered to a metal, glass or other resins. Thus, there is a problem on heat-resistance, chemical resistance and solvent resistance of an epoxy resin or an urethane resin upon use. This report does not explicitly describe a method for adhering directly the fluorine-containing polymer to a metal, glass or other resins.

SUMMARY OF THE INVENTION

An object of the present invention is to solve the aforementioned problems of the prior art and provide a fluorine-containing adhesive material which can impart the firm direct adhesion strength to substrates such as a metal, a glass and a resin while maintaining the excellent properties such as chemical resistance, solvent resistance, weatherability, soil releasability and unstickness, possessed by a fluorine-containing polymer, as well as a laminate and a shaped article comprising the same. Another object of the present invention is to provide a fluorine-containing adhesive material which can firmly adhere to the above-mentioned substrates by, particularly, a heat melting adhesion, as well as a laminate comprising the same.

A fluorine-containing adhesive material according to the present invention comprises a fluorine-containing polymer having a specified range of number of carbonate groups and/or carboxylic acid halide groups at polymer chain terminals or side chains. The present inventors discovered that when a carbonate group and/or a carboxylic acid halide group are introduced into a fluorine-containing ethylenic polymer, a fluorine-containing adhesive material has surprisingly strong adhesion strength to synthetic resins, metals, glass and other materials, without the surface treatment and adhesive resin (such as primer) coating treatment usually conducted for the adhesion of fluororesin.

In addition, the present inventors discovered that when a total number of carbonate groups and carboxylic acid halide groups in the fluorine-containing ethylenic polymer is limited to a certain range, the evolution of gas caused by a chemical change of carbonate groups or carboxylic acid halide groups associated with an adhesion operation can be restricted to a minimum amount, thereby increasing the adhesion strength.

Further, the present inventors discovered that a laminate retaining the high adhesion state and a shaped article comprising the same can be obtained by selecting a specified fluorine-containing ethylenic polymer and a counterpart material, and specified shaping conditions.

DETAILED DESCRIPTION OF THE INVENTION

The fluorine-containing adhesive material of the present invention has a carbonate group and/or a carboxylic acid halide group at an end or a side chain of the polymer. When the fluorine-containing material has the carbonate group, the fluorine-containing material comprises a fluorine-containing ethylenic polymer having less than 150 carbonate groups per $1 \times 10^6$ main chain carbon atoms of the fluorine-containing ethylenic polymer. When the fluorine-containing material has the carboxylic acid halide group, the fluorine-containing material comprises a fluorine-containing ethylenic polymer having less than 150 carboxylic acid halide groups per $1 \times 10^6$ main chain carbon atoms of the fluorine-containing ethylenic polymer. When the material has both the carbonate group and the carboxylic acid halide group, the material comprises a fluorine-containing ethylenic polymer having totally less than 150 those groups per $1 \times 10^6$ main chain carbon atoms of the fluorine-containing ethylenic polymer. In the present invention, the number of the carboxylic acid halide groups alone may be less than 100 per $1 \times 10^6$ main chain carbon atoms of the fluorine-containing ethylenic polymer. In the following explanation, a carbonate group and/or a carboxylic acid halide group are collectively referred to as simply "carbonyl group-containing functional group".

The fluorine-containing adhesive material of the present invention comprises a fluorine-containing ethylenic polymer having a carbonyl group-containing functional group at a chain end or a side chain of the polymer, and the number of the carbonyl group-containing functional groups is less than 150 per $1 \times 10^6$ main chain carbon atoms. Even if the number is at least 150, the sufficient adhesion strength is exhibited. If the number is less than 150, the evolution of gas caused by a chemical change of carbonate groups or carboxylic acid halide groups associated with an adhesion operation can be prevented to improve the adhesion strength and to prevent unevenness of the adhesion strength. When the number of the carbonyl group-containing functional groups is less than 150, the heat resistance and chemical resistance of the fluorine-containing adhesive material can be improved.

The number of carbonyl group-containing functional groups in the fluorine-containing ethylenic polymer of the present invention can be appropriately selected from a range of less than 150 depending on a type and shape of a substrate to be adhered, a purpose of adhesion, an application, a required adhesion strength, a form, of an adhesive polymer and an adhering method. Preferably, the number of carbonyl group-containing functional groups is less than 100, more preferably less than 80, particularly less than 50, per $1 \times 10^6$ carbons. A lower limit of number of carbonyl group-containing functional groups may be 10, preferably 20, for example 30.

The fluorine-containing adhesive material shows the good initial adhesion strength, and the good durability against temperature change (for example, the use at a low temperature or a high temperature) and permeation of water and solvents.

The carbonate group in the fluorine-containing ethylenic polymer of the present invention is generally a group having a linkage of —OC(=O)O— and, more particularly has the structure of —OC(=O)O—R group, wherein R is a hydrogen atom, an organic group (for example, a $C_1$ to $C_{20}$ alkyl group (particularly a $C_1$ to $C_{10}$ alkyl group) and a $C_2$ to $C_{20}$ alkyl group having an ether linkage) or I, II and VII group element. Examples of the carbonate group are preferably —OC(=O)OCH$_3$, —OC(=O)OC$_3$H$_7$, —OC(=O)OC$_8$H$_{17}$, and —OC(=O)OCH$_2$CH$_2$OCH$_2$CH$_3$.

The carboxylic acid halide group in the fluorine-containing ethylenic polymer of the present invention has specifically the structure of —COY wherein Y is a halogen element. Examples of the carboxylic acid halide group are —COF and —COCl.

The amount of the carbonyl group-containing functional group in the fluorine-containing ethylenic polymer of the present invention can be measured by performing an infrared absorption spectrometry. The fluorine-containing adhesive material comprising the fluorine-containing ethylenic polymer having these carbonyl group-containing functional groups itself can maintain the excellent properties such as chemical resistance, solvent resistance, weatherability, soil releasability and unstickness which are the general characteristics of the fluorine-containing polymer, and can impart such excellent characteristics to an adhered laminate without lowering the characteristics. The fluorine-containing ethylenic polymer of the present invention is preferably insoluble in usual solvents (particularly, fluorine-free solvents) such as ester solvents and ketone solvents used in paint and adhesive fields, in view of chemical resistance and solvent resistance. In the context of the present invention, the wording "insoluble in solvents" means that a residual portion of insoluble fluororesin is visible, even if the fluorine-containing resin is kept in contact with a solvent for a sufficient period of time (for example, a period of 1 hour to one day, particularly a period of 24 hours) under generally used temperature conditions (for example, a temperature of 0° C. to 100° C., particularly a temperature of 20° C.) which is at most melting point of the fluorine-containing resin and at most boiling point of the solvent.

In the fluorine-containing ethylenic polymer of the present invention, the carbonyl group-containing functional group is bonded to the chain end or the side chain of the polymer.

More particularly, the fluorine-containing adhesive material comprises:

(1) a fluorine-containing ethylenic polymer having only a carbonate group at a chain end or a side chain of the polymer, the number of the carbonate groups being less than 150 per $1 \times 10^6$ main chain carbon atoms, (2) a fluorine-containing ethylenic polymer having only a carboxylic acid halide group at chain end or a side chain of the polymer, the number of the carboxylic acid halide groups being less than 150 per $1 \times 10^6$ main chain carbon atoms, or (3) a fluorine-containing ethylenic polymer having both a carbonate group and a carboxylic acid halide group, the total number of these functional groups being less than 150 per $1 \times 10^6$ main chain carbon atoms. Any of the polymers (1) to (3) may be used. The polymer (1) or (3) is more preferable. The polymer (1) imparts the advantageous effect that pellets are easily handled, because the carbonate group is extremely stable at the temperature between a normal temperature (20° C.) and a shaping temperature. The polymer (3) imparts the advantageous effects that range of adhesion reaction conditions are broadened and the adhesion strength is increased, because a reaction rate and easiness of reaction are quite different between the carbonate group and the carboxylic acid halide group.

The fluorine-containing ethylenic polymer having carbonyl group-containing functional group at an chain end of the polymer is a polymer having a carbonyl group-containing functional group at one end or both ends of the polymer chain. On the other hand, the fluorine-containing ethylenic polymer having carbonyl group-containing functional group at side chain has the structure of a fluorine-containing ethylenic polymer obtained by copolymerizing an ethylenic monomer having a carbonate group and/or a carboxylic acid halide group with another fluorine-containing ethylenic monomer. Alternatively, it may have the carbonyl group-containing functional group at both an chain end and a side chain of one polymer chain.

Among them, the adhesive material having carbonyl group-containing functional group at polymer chain end is preferable because heat-resistance, mechanical property and chemical resistance are not remarkably deteriorated and because it is advantageous in terms of the productivity and cost.

In the present invention, the fluorine-containing ethylenic polymer having carbonyl group-containing functional group at polymer chain end may comprise a polymer chain having a carbonyl group-containing functional group at one end or both ends of one polymer chain or may comprise a mixture of a polymer chain having a carbonyl group-containing functional group at one end or both ends of a polymer chain and a polymer chain free from a carbonyl group-containing functional group.

That is, even if the fluorine-containing polymer free from carbonyl group-containing functional group exists in the fluorine-containing ethylenic polymer, as long as the fluorine-containing polymer has less than 150, preferably less than 100, more preferably less than 80, particularly less than 50 carbonyl group-containing functional groups per $1 \times 10^6$ main chain carbon atoms as a whole (that is, in the total of the fluorine-containing ethylenic polymer having carbonyl group-containing functional group and the fluorine-containing polymer free from carbonyl group-containing functional group), the adherability to various materials is not deteriorated.

A type and structure of the fluorine-containing ethylenic polymer of the present invention are appropriately selected depending upon purpose, application and how to use. Inter alia, it is preferable that a crystal melting point or a glass transition point is at most 270° C. In particular, when the lamination is performed by heat melting adhering process, the ability of the carbonyl group-containing functional group in adhering to the other material can be exerted maximally and the strength for adhering directly to the substrate can be imparted. In addition, preferably, when the crystal melting point or the glass transition point is at most 230° C. and, more preferably at most 210° C., for example, at most 200° C., the lamination with an organic material having the relatively low heat-resistance preferably becomes possible.

In the context of the present invention, "crystal melting point" and "glass transition point" mean a crystal melting point alone when a subject polymer is crystalline and has a crystal melting point in the DSC measurement mentioned herein after, and mean a glass transition point alone when the melting point cannot be detected in the DSC measurement.

The fluorine-containing ethylenic polymer is a polymer (a homopolymer or a copolymer) having a repeating unit derived from at least one fluorine-containing ethylenic monomer.

The fluorine-containing ethylenic monomer is an olefinically unsaturated monomer having at least one fluorine atom, more particularly, tetrafluoroethylene, vinylidene fluoride, chlorotrifluoroethylene, vinyl fluoride, hexafluoropropylene, hexafluoroisobutene, a monomer represented by the formula (ii).

$$CH_2=CX^1(CF_2)n^{X2} \qquad (ii)$$

wherein $X^1$ is H or F, $X^2$ is H, F or Cl, and n is an integer of from 1 to 10, and perfluoro (alkyl vinyl ethers).

In addition, the fluorine-containing ethylenic polymer of the present invention may be a copolymer having the aforementioned fluorine-containing ethylenic monomer unit and an ethylenic monomer unit free from a fluorine atom.

The amount ratio of the fluorine-containing ethylenic monomer unit and the ethylenic monomer unit free from fluorine atom may be from 10 to 100% by mol (for example, from 30 to 100% by mol) and from 0 to 90% by mol (for example, from 0 to 70% by mol), respectively.

The ethylenic monomer free from fluorine atom is preferably selected from an ethylenic monomer having at most 5 carbon atoms so as not to deteriorate the heat-resistance and the chemical resistance. More particularly, ethylene, propylene, 1-butene, 2-butene, vinyl chloride and vinylidene chloride can be exemplified.

Among them, a fluorine-containing ethylenic polymer involving tetrafluoroethylene unit as an essential component is preferable from a viewpoint of heat-resistance and chemical resistance and a fluorine-containing ethylenic polymer involving vinylidene fluoride unit as an essential component is also preferable from a viewpoint of shaping processability.

In the fluorine-containing ethylenic polymer of the present invention, the crystal melting point or the glass transition point of the polymer can be adjusted by selecting a type, combination and composition ratio of the fluorine-containing ethylenic monomer. The polymer may be a resin-type or an elastomer-type. The nature of the fluorine-containing ethylenic polymer may be appropriately selected depending upon purpose and application of adhesion, and purpose and application of the laminate.

Preferable examples of the fluorine-containing ethylenic polymer are:

(I) a copolymer containing tetrafluoroethylene and ethylene units, (II) a polymer containing vinylidene fluoride unit, and (III) a copolymer containing units derived from tetrafluoroethylene and a monomer represented by the formula (i):

$$CF_2=CF-Rf^1 \qquad (i)$$

wherein $Rf^1$ is $CF_3$ or $ORf^2$ ($Rf^2$ is a perfluoroalkyl group having 1 to 5 carbon atoms).

As the copolymer (I) containing tetrafluoroethylene units and ethylene units, mentioned is a copolymer having carbonyl group-containing functional group which comprises 20 to 90% by mol (for example, 20 to 60% by mol) of tetrafluoroethylene unit, 10 to 80 % by mol (for example, 20 to 60% by mol) of ethylene unit and 0 to 70% by mol of monomer unit copolymerizable therewith relative to whole monomers except for the monomer having carbonyl group-containing functional group (in the case of having carbonyl group-containing functional group at a side chain).

Examples of the copolymerizable monomer are hexafluoropropylene, chlorotrifluoroethylene, a monomer represented by the formula (ii):

$$CH_2=CX^1(CF_2)_nX^2 \qquad (ii)$$

wherein $X^1$ is H or F, $X^2$ is H, F or Cl, and n is an integer of from 1 to 10, perfluoro(alkyl vinyl ethers), and propylene. Normally, one or at least two of them are copolymerized.

These exemplified fluorine-containing ethylenic polymers having carbonyl group-containing functional group are preferable in that they are excellent in heat-resistance, chemical resistance, weatherability, electrical insulating property and unstickness.

Among them, (I-1) a copolymer having carbonyl group-containing functional group which comprises 62 to 80 % by mol of tetrafluoroethylene unit, 20 to 38% by mol of ethylene unit and 0 to 10% by mol of the other monomer unit, and (I-2) a copolymer having carbonyl group-containing functional group which comprises 20 to 80% by mol of tetrafluoroethylene unit, 10 to 80% by mol of ethylene unit, 0 to 30% by mol of hexafluoropropylene unit and 0 to 10% by mol of the other monomer unit are preferable in that they can maintain the excellent properties of a tetrafluoroethylene/ethylene copolymer, a melting point can be relatively low and the adherability to the other material is excellent.

As a preferable example of the polymer (II) containing vinylidene fluoride unit, mentioned is a copolymer having a carbonyl group-containing functional group which comprises 10 to 100% by mol of vinylidene fluoride unit, 0 to 80% by mol of tetrafluoroethylene unit, and 0 to 30% by mol of at least one unit of hexafluoropropylene and chlorotrifluoroethylene relative to whole monomers except for a monomer having a carbonyl group-containing functional group (in the case of having a carbonyl group-containing functional group at a side chain).

More particularly, mentioned are preferably (II-1) polyvinylidene fluoride (PVdF) having a carbonyl group-containing functional group, (II-2) a copolymer having a carbonyl group-containing functional group which comprises 30 to 99% by mol of vinylidene fluoride unit and 1 to 70% by mol of tetrafluoroethylene unit, (II-3) a copolymer having a carbonyl group-containing functional group which comprises 60 to 90% by mol of vinylidene fluoride unit, 0 to 30% by mol of tetrafluoroethylene unit, and 1 to 20% by mol of chrolotrifluoroethylene unit, (II-4) a copolymer having a carbonyl group-containing functional group which comprises 60 to 99% by mol of vinylidene fluoride unit, 0 to 30% by mol of tetrafluoroethylene unit, and 1 to 10% by mol of hexafluoropropylene unit, and (II-5) a copolymer having a carbonyl group-containing functional group which comprises 15 to 60% by mol of vinylidene fluoride unit, 35 to 80% by mol of tetrafluoroethylene unit, and 5 to 30% by mol of hexafluoropropylene unit.

The fluorine-containing polymer (II) having carbonyl group-containing functional group comprising vinylidene fluoride unit is excellent in weatherability and the like, can be shaped and processed at a low temperature, and can be laminated with an organic material having the low heat-resistance.

As the polymer (III), preferable are (III-1) a copolymer having a carbonyl group-containing functional group which comprises 65 to 95% by mol, preferably 75 to 95% by mol of tetrafluoroethylene unit, and 5 to 35 % by mol, preferably 5 to 25% by mol of hexafluoropropylene unit, (III-2) a copolymer having a carbonyl group-containing functional group which comprises 70 to 97 % by mol of tetrafluoroethylene unit, and 3 to 30% by mol of $CF_2=CFORf^2$ ($Rf^2$ is a perfluoroalkyl group having 1 to 5 carbon atoms), and (III-3) a copolymer having a carbonyl group-containing functional group which comprises tetrafluoroethylene unit, hexafluoropropylene unit, and $CF_2=CFORf^2$ ($Rf^2$ is as defined above) unit, wherein a total of the hexafluoropropylene unit and the $CF_2=CFORf^2$ unit is from 5 to 30% by mol.

These are so-called "perfluorocopolymer" and are most excellent in heat-resistance, chemical resistance, water repellency, unstickness and electrical insulating property among fluorine-containing polymers.

The fluorine-containing ethylenic polymer of the present invention can be obtained by copolymerizing an ethylenic monomer having a carbonyl group-containing functional group or derivative thereof with a fluorine-containing ethylenic monomer or a fluorine-free ethylenic monomer corresponding to a fluorine-containing polymer having a target composition. On the other hand, although various methods can be adopted in order to give a fluorine-containing ethylenic polymer having a carbonyl group-containing functional group at a polymer molecule end, a method using a peroxide such as peroxycarbonate as a polymerization initiator can be preferably adopted from a viewpoint of economics and the quality such as heat-resistance and chemical resistance.

As the peroxycarbonate used for introducing a terminal carbonyl group-containing functional group, preferably used are compounds represented by the following formulas (1) to (4);

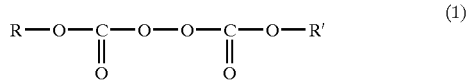

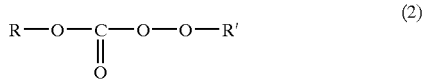

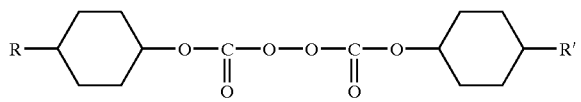

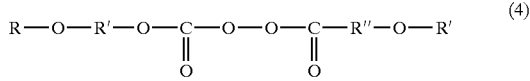

wherein R and R' represent a linear or branched monovalent saturated hydrocarbon group having 1 to 15 carbon atoms, or linear or branched monovalent saturated hydrocarbon group having 1 to 15 carbon atoms containing alkoxy group at an end, and R" represents linear or branched divalent saturated hydrocarbon group having 1 to 15 carbon atoms, or linear or branched divalent saturated hydrocarbon group having 1 to 15 carbon atoms containing alkoxy group at an end.

Inter alia, di-n-propylperoxydicarbonate, t-butylperoxyisopropylcarbonate, bis(4-t-butylcyclohexyl) peroxydicarbonate, and di-2-ethylhexylperoxydicarbonate are preferable.

An amount of the peroxycarbonate to be used is different depending upon a type (composition or the like) and a molecular weight of the polymer of interest, polymerization conditions, and a type of peroxycarbonate to be used and is preferably from 0.05 to 20 parts by weight, particularly from 0.1 to 10 parts by weight per 100 parts by weight of the polymer obtained by polymerization.

As a method for polymerization, suspension polymerization in an aqueous medium using a fluorine-containing solvent and using the peroxycarbonate as a polymerization initiator is industrially preferable. However, other polymerization methods such as solution polymerization, emulsion polymerization and bulk polymerization can be adopted.

In the suspension polymerization, a fluorine-containing solvent may be used in addition to water. As the fluorine-containing solvent used for suspension polymerization, hydrochlorofluoroalkanes (for example, $CH_3CClF_2$, $CH_3CCl_2F$, $CF_3CF_2CCl_2H$, and $CF_2ClCF_2CFHFl$), chlorofluoroalkanes (for example, $CF_2ClCFClCF_2CF_3$, and $CF_3CFClCFClCF_3$), and perfluoroalkanes (for example, perfluorocyclobutane, $CF_3CF_2CF_2CF_3$, $CF_3CF_2CF_2CF_2CF_3$, and $CF_3CF_2CF_2CF_2Cf_2CF_3$) can be used. Inter alia, the perfluoroalkanes are preferable. An amount of the fluorine-containing solvent is preferably from 10 to 100% by weight relative to water from a viewpoint of suspension stability and economics.

A polymerization temperature is not particularly limited and may be from 0° C. to 100° C.

A polymerization pressure is appropriately determined depending upon a type, an amount and a vapor pressure of a solvent used, and other polymerization conditions such as a polymerization temperature and may be normally from 0 $kgf/cm^2G$ to 100 $kgf/cm^2G$.

Upon preparation of the fluorine-containing ethylenic polymer of the present invention, in order to adjust a molecular weight, a conventional chain transfer agent, for example, a hydrocarbon such as isopentane, n-pentane, n-hexane and cyclohexane; an alcohol such as methanol and ethanol; a halogenated hydrocarbon such as carbon tetrachloride, chloroform, methylene chloride and methyl chloride can be used.

The amount of the carbonate group at end of polymer chain can be controlled by adjusting the polymerization conditions. Inter alia, it can be easily controlled by an amount of peroxycarbonate used as the polymerization initiator, an amount of the chain transfer agent to be used, a polymerization temperature and the like.

Although various methods can be adopted in order to give a fluorine-containing ethylenic polymer having a carboxylic acid halide group at a polymer molecule end, for example, it can be obtained by heating and degrading (decarbonation) a carbonate group of the aforementioned fluorine-containing ethylenic polymer having the carbonate group at chain end.

The heating is preferably carried out so that the polymer itself becomes at least 270° C., preferably at least 280° C., particularly preferably at least 300° C. although it is different depending upon a type of the carbonate group and a type of the fluorine-containing ethylenic polymer. The upper limit of a heating temperature is preferably equal to or below a thermal degrading temperature of a portion other than the carbonate group of the fluorine-containing ethylenic polymer and, more particularly, at most 400° C., particularly preferably at most 350° C.

The fluorine-containing ethylenic polymer of the present invention is preferably used alone for the adhesive material so as not to affect adversely the adherability, heat-resistance and chemical resistance possessed by itself. However, in such a range that its performance is not adversely affected, various fillers such as inorganic powder, glass fiber, carbon fiber, metal oxide and carbon may be incorporated depending upon purpose and application. A pigment, an ultraviolet-absorbing agent and other arbitrary additive may be incorporated therein besides a filler. A resin such as another fluororesin, a thermoplastic resin and a thermosetting resin, and a synthetic rubber may be incorporated besides the above-mentioned additives and, thereby, the improvement of the mechanical property, the improvement of weatherability, the provision of design property, the prevention of static electricity and the improvement of shapability become possible.

The fluorine-containing adhesive material comprising the fluorine-containing ethylenic polymer can be used as various forms such as a powder, a pellet, a preformed film or sheet, a shaped article, an aqueous dispersion, and an organic solvent dispersion.

The good adhesion state is formed between the fluorine-containing adhesive material and the other material by contacting the other material with the fluorine-containing adhesive material which has been processed into a variety of these shapes, for example, at heated and pressurized state. The fluorine-containing adhesive material of the present invention can impart the firmer adhesion strength by contacting with the other material, particularly, in the molten state.

In particular, the material which can be melt-molded among the fluorine-containing adhesive materials of the present invention can be used itself as a material for shaping and can be prepared into a shaped article by the previously known method such as an injection molding, an extrusion, an inflation molding, a coating, and an insert molding using a mold. Laminates having various shapes such as a film, a sheet, a tube and a hose can be manufactured directly by coextrusion. In addition, a film and a sheet can be manufactured at first and the resultant film and sheet can be laminated with the other material to prepare a laminate.

Various fluorine-containing adhesive materials of the present invention as described above may also be used for treating the surface of powders or as a paint.

For example, the fluorine-containing adhesive material of the present invention can be formulated into a powder, an aqueous dispersion or an organic solvent dispersion to give a paint composition. The fluorine-containing adhesive material of the present invention can be used as a primer for a fluorine-containing paint by utilizing the adherability to various other materials possessed by the fluorine-containing adhesive material.

In the present invention, the aforementioned fluorine-containing adhesive material can be shaped into a fluorine-containing adhesive film (hereinafter referred to as "adhesive film").

From a viewpoint of development of a composite material, rationalization and automation of adhesion work, and prevention of pollution, a hot melt adhesive has progressed. However, the use of an applicator is essential for general hot melt adhesives. To the contrary, a film-shaped adhesive dose not need the applicator and can be adhered by placing on a substrate or between substrates and hot-pressing, being also advantageous in a viewpoint of simple process. Since a homogeneous adhesive layer is formed on the whole surface of the substrate, the uniform adhesion strength all over the surface of substrates is obtained and, thus, substrates having no or worse compatibility can be dealt with. Further, the film-shaped adhesive can be used by cutting into various shapes and work loss is small and work environment is better, being advantageous from a viewpoint of cost.

The adhesive film of the present invention has the above-mentioned advantages.

The adhesive film can be manufactured by using a various fluorine-containing adhesive materials depending upon the application and purpose, the film manufacturing steps, and an adhering method among the aforementioned fluorine-containing adhesive materials. Since the adhesive film itself has excellent heat-resistance, chemical resistance, mechanical property and unstickiness at temperature of using laminate, can be effectively formed into the film by, for example, a melt shaping, has the better mold-processability at a relatively low temperature among fluororesins, can be formed into a thin and homogeneous film and, additionally, can be melt and firmly and smartly adhered to various substrates at a relatively low temperature by various thermal pressing methods, a fluorine-containing adhesive material comprising the above-mentioned copolymer (I), (II) or (III), specifically a fluorine-containing adhesive film obtained by melt shaping using the above-mentioned (I-1), (I-2), (II-1), (II-2), (II-3), (II-4), (III-1), (III-2) and/or (III-3) are preferable.

The thickness of the fluorine-containing adhesive film of the present invention is selected depending upon purpose and application and is not particularly limited. The thickness of the fluorine-containing adhesive film may be from 1 to 3,000 $\mu$m, preferably from 3 to 500 $\mu$m, particularly preferably from 5 to 300 $\mu$m.

Too thin films require special manufacturing methods, and are difficult to be handled upon the adhering procedures, which easily leads to crease, damage and worse appearance. In some cases, they are insufficient in respect of adhesion strength, mechanical strength, chemical resistance and weatherability. Too thick films are disadvantageous in respect of cost and workability upon incorporation by bonding.

Further, the present invention can provide a fluorine-containing adhesive laminate film (hereinafter referred to as "adhesive laminate film") prepared by laminating:

(A-1) a layer comprising the above-mentioned fluorine-containing adhesive material, and (D-1) a layer comprising a fluorine-containing ethylenic polymer free from carbonyl group-containing functional group.

That is, one surface has the adherability to the substrate derived from a fluorine-containing ethylenic polymer comprising a fluorine-containing ethylenic polymer having carbonyl group-containing functional groups, and the other surface is a layer comprising a conventional fluorine-containing polymer. The excellent properties such as chemical resistance, solvent resistance, weatherability, soil releasability, unstickiness, low friction and electrical property can be imparted to the substrate or the laminate comprising the substrate by contacting a fluorine-containing adhesive surface with the substrate and adhering them by procedures such as thermal pressing.

In the adhesive laminate film of the present invention obtained by laminating layers (A-1) and (D-1), the fluorine-containing ethylenic polymer (D-1) can be specifically selected from polytetrafluoroethylene (PTFE), a tetrafluoroethylene/perfluoro(alkyl vinyl ether) copolymer (PFA), a tetrafluoro-ethylene/hexafluoropropylene copolymer (FEP), an ethylene/tetrafluoroethylene copolymer (ETEE), an ethylene/chlorotrifluoroethylene (ECTFE), polyvinylidene fluoride (PVdF), a vinylidene fluoride copolymer and the like. In order to maintain and utilize the better shaping and adhesion processabilities of the adhesive laminate film of the present invention at the time of laminating the layers (A-1) and (D-1) or upon adhesion to the other material, it is preferable to select the layer (D-1) from fluorine-containing polymers having a crystal melting point or a glass transition point of at most 270° C. Thereby, the excellent properties of the aforementioned fluorine-containing polymers can be preferably imparted to the substrate or the laminate comprising the substrate.

Although each layer constituting the adhesive laminate film comprising two layers of the present invention can be variously selected depending upon purpose, application and a processing method, it is preferable that the adherability and compatibility are good.

Specifically, the layer (A-1) having the adherability among two layers is preferably selected from polymers so that a carbonyl group-containing functional group imparting the adherability is introduced to the polymer having the similar monomer composition as in the layer (D-1) comprising the fluorine-containing ethylenic polymer.

More particularly, i) a fluorine-containing adhesive laminate film obtained by laminating:
   (A-1) a layer comprising a fluorine-containing adhesive material comprising the above-mentioned copolymer (I), and
   (D-1) a layer comprising a copolymer comprising tetrafluoroethylene unit and ethylene unit is preferable in that it imparts the excellent heat-resistance, chemical resistance, solvent resistance and mechanical properties and is excellent in melt shaping processability;

ii) a fluorine-containing adhesive laminate film obtained by laminating:
   (A-1) a layer comprising a fluorine-containing adhesive material comprising the above-mentioned polymer (II), and (D-1) a layer comprising at least one polymer selected from the group consisting of PVdF and a vinylidene fluoride copolymer is preferable in that it is excellent in weatherability and shaping processability; and iii) a fluorine-containing adhesive laminate film obtained by laminating:

(A-1) a layer comprising a fluorine-containing adhesive material comprising the above-mentioned polymer (III), and (D-1) a layer comprising a polymer comprising 75 to 100% by mol of tetrafluoroethylene unit and 0 to 25% by mol of a monomer unit represented by the formula (i):

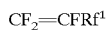 (i)

wherein $Rf^1$ is $CF_3$ or $ORf^2$ ($Rf^2$ is a perfluoroalkyl group having 1 to 5 carbon atoms) is preferable in that it is particularly excellent in heat-resistance, chemical resistance, unstickness at use of laminate and water repellency.

The thickness of the adhesive laminate film of the present invention having two layers is selected depending upon purpose and application and is not particularly limited. The total thickness of two layers is from 5 to 5,000 $\mu$m, preferably from 10 to 1,000 $\mu$m, particularly preferably from 12 to 500 $\mu$m.

Regarding the thickness of each layer, the adhesive layer (A-1) may be from 1 to 1,000 $\mu$m and the fluorine-containing ethylenic polymer layer (D-1) may be from 4 to 4,995 $\mu$m. Preferably, the thickness of the adhesive layer (A-1) is from 3 to 500 $\mu$m and the thickness of the fluorine-containing polymer layer (D-1) is from 5 to 990 $\mu$m and, particularly preferably, the layer (A-1) is from 5 to 200 $\mu$m and the layer (D-1) is from 10 to 490 $\mu$m.

In the present invention, a reinforcing agent, a filler, a stabilizer, an ultraviolet absorbing agent, a pigment and other additives may be appropriately contained in the adhesive film and at least one layer of the adhesive laminate film in such a-range that the addition of additives does not deteriorate the properties. By the addition of such additives, it is also possible to improve heat stability, surface hardness, abrasion resistance, weatherability, electrification and others.

The adhesive film of the present invention can be prepared by a heat press method, an extrusion method, a cutting method, and a method of coating a powder, or an aqueous or organic solvent dispersion to form a continuous film and the like, depending upon a type of a polymer used and a shape of a film of interest.

For example, the containing fluorine-containing adhesive material having functional group of the present invention is an adhesive material having good melt shaping processability even at a relatively low temperature and, for this reason, the compression molding and the extrusion can be adopted. In particular, the melt extrusion is a preferable method for the reasons of productivity and quality.

For preparing an adhesive laminate film of the present invention comprising two layers (A-1) and (D-1) by bonding and unifying, a method of piling each of the shaped films (A-1) and (D-1) and compression molding them, a method of coating one layer on the other shaped film, and a method of achieving simultaneously a film shaping and a bond by a multilayer coextrusion process may be adopted. Inter alia, a multilayer coextrusion method is preferable in terms of productivity and quality.

Adhesion of the adhesive film of the present invention and the adhesive laminate film with the substrate is accomplished by thermal activation by heating or the like. The heat melting adhesion is preferable. In particular, the fluorine-containing adhesive material of the present invention manifests the firm adhesion strength to the other materials upon heat melting adhesion. Representative adhering methods are a thermal roll method, a thermal pressing method, a high frequency heating method, a vacuum contact bonding method (such as vacuum pressing), and an air pressure method. When the other material is a thermoplastic resin, for example, a coextrusion method can be used. The adhering method can be appropriately selected depending upon a type and shape of the other materials and a state and type of the film.

The adhesive film and the adhesive laminate film of the present invention are constructed by various shapes, sizes and thickness as described above and can be used for a wide range of application due to the excellent adherability to various substrates and the excellent properties possessed by the fluorine-containing polymer. They may be used, for example, as a protection covering material for metal. Examples of the application are a corrosion-resistant tape for wrapping chemical plarit pipings, a corrosion-resistant tape for wrapping a bottom of chemical plant can, a tape for corrosion prevention of pipings such as shipdeck, a corrosion-resistant tape for the other pipings, the application for imparting weatherability to, for example, a signboard, an agricultural and other greenhouse roof or side wall, an exterior decorated material, and a surface of a solar cell requiring excellent weather resistance. Further, they can be also used for the utilities requiring chemical resistance such as food wrapping and drug wrapping.

In addition, they can be used for the utilities requiring unstickness and low friction property such as a fixation roll and a press roll for a copying machine and a printer, utilities requiring low stickness and low frictional property such as a food processing apparatus and a cooking machine, utilities requiring the electrical properties such as a printed board, utilities requiring the water repellency such as a water repellent glass, and liquid crystal related material utilities such as a liquid crystal display, and motorcar related material utilities.

Further, the present invention relates to a laminate comprising the aforementioned fluorine-containing adhesive material and another material.

The fluorine-containing adhesive material (A) having a carbonyl group-containing functional group of the present invention has excellent properties for directly adhering to various materials such as various inorganic materials and organic materials without any surface treatment and can form various laminates.

A first embodiment of the laminate of the present invention (hereinafter referred to as "laminate 1") is a laminate comprising:

(A-2) a layer comprising the aforementioned fluorine-containing adhesive material, (B-1) a layer comprising an organic material having a functional group exhibiting the affinity or reactivity with the layer (A-2), particularly a carbonyl group-containing functional group.

The thickness of the laminate 1may be from 10 to 10,000 $\mu$m, preferably from 15 to 4,000 $\mu$m. The thickness of the fluorine-containing adhesive material layer (A-2) may be from 1 to 2,000 $\mu$m, preferably from 3 to 1000 $\mu$m. The thickness of the organic material layer (B-1) may be from 5 to 9,000 $\mu$m, preferably from 10 to 3,000 $\mu$m.

That is, the fluorine-containing adhesive material (A-2) of the present invention can impart better adhesion strength not only to a fluorine-containing polymer but also other organic materials due to effect of the carbonyl group-containing functional group contained therein. Inter alia, an organic material having a functional group having the reactivity or the affinity with the carbonyl group-containing functional group in the layer (A-2) is preferable in view of the adhesion strength with the layer (A-2).

The organic material in the laminate 1 of the present invention is a synthetic polymer material such as a synthetic resin, a synthetic rubber, a synthetic fiber and a synthetic leather, a natural organic material such as a natural rubber, a natural fiber, a wood, a paper and a leather, or a composite of them.

Inter alia, a fluorine-free polymer material compensates the mutual defects by laminating the fluorine-containing polymer, so that such laminate can be used for various applications.

Examples of the fluorine-free polymer are polyester, polyamide, polyphenylene sulfide, polyacrylate, polyvinyl acetate, polyolefin, polyvinyl chloride, polycarbonate, polystyrene, polyurethane, an acrylonitrile/butadiene/styrene copolymer (ABS), polyimide, polyamideimide, polyetheretherketone (PEEK), polyether sulfone (PES), polysulfone, polyphenylene oxide (PPO), polyaramide, polyacetal, polyetherimide, a silicone resin, an epoxy resin, a phenol resin, an amino resin, an unsaturated polyester, and a cellulose derivative.

Inter alia, (1) a polymer material having a functional group having the reactivity or affinity with a carbonyl group-containing functional group in a molecule is preferable in view of the property of adhering to the fluorine-containing adhesive material of the present invention.

In the context of the present invention, the "functional group having reactivity with carbonyl group-containing functional group" means a functional group, when the shaping conditions mentioned hereinafter are used, which can react with carbonate group and/or carboxylic acid halide group at the shaping to form a chemical bond. The "functional group having affinity with carbonyl group-containing functional group" means a functional group which can exhibit an intermolecular force with a polar group such as a carbonate group and/or a carboxylic acid halide group and which has at least one atom other than carbon and hydrogen atoms. More particularly, those having the functional group such as a hydroxyl group, a carboxyl group, a carboxylic salts, an ester group, a carbonate group, an amino group, an amide group, an imide group, a mercapto group, a thiolate group, a sulfonic acid group, sulfonic salts and an epoxy group are preferable. (2) A polymer material excellent in heat-resistance is preferable in that it withstands a high shaping temperature required for a fluororesin and maintains heat-resistance as a whole laminate, and such laminate can impart both excellent properties of a fluorine-containing polymer and properties of a counterpart polymer material. (3) A thermoplastic resin is preferable in that the adhesion to the fluorine-containing adhesive material of the present invention and shaping can be carried out at the same time, that is, the melt multilayer shaping can be carried out. Inter alia, a thermoplastic resin having a crystal melting point of at most 270° C., particularly at most 230° C. is preferable in that the multilayer shaping such as coextrusion can be conducted and it manifests the particularly excellent adherability upon melt adhering processing.

More particularly, polyamide, polyester, polycarbonate, polyamideimide, PES, polysulfone, PPO, polyetherimide, polyacetal, polyvinyl alcohol, an ethylene/vinyl alcohol copolymer, and an epoxy-modified polyethylene are preferable. Inter alia, polyamide, polyester and polycarbonate are preferable examples in that they are excellent in melt shaping property, polymers themselves are excellent in mechanical properties, they can impart excellent chemical resistance, solvent resistance, solvent impermeability, weatherability, soil releasability and optical properties (low refractive index) by laminating with a fluororesin.

Inter alia, polyamide is preferable and examples of the polyamide are (1) a polyamide resin, (2) a polyamide elastomer (3) a polyamide resin alloy.

Examples thereof are as follows:

(1) A polyamide resin which is synthesized by ring opening polymerization of cyclic aliphatic lactam; condensation polymerization of aliphatic and/or cycloaliphatic diamine and aliphatic and/or cycloaliphatic dicarboxylic acid; condensation polymerization of aminocarboxylic acid; copolymerization with a dimer acid containing, as a main component, a dicarboxylic acid having 36 carbon atoms, obtained by dimerization of unsaturated fatty acid, and with a short chain dibasic acid.

Examples thereof include nylon 6, nylon 66, nylon 11, nylon 12, nylon 610, nylon 612, nylon 6/66, nylon 66/12, nylon 46, a polymer of m-xylylenediamine/adipic acid, a copolymer of monomers constituting these with dimeric acids, and blends thereof.

An average molecular weight of the polyamide resin is normally from 5,000 to 500,000. Among these polyamide resins, polyamides 11, 12, 610 and 612 are preferably used for the laminate tube of the present invention.

(2) A polyamide elastomer which is ABA block type polyetheresteramide, polyetheramide or polyesteramide having a polyamide component as a crystalline hard segment and a polyether or polyester component as a soft segment. This can be obtained, for example, by condensation reaction of lauryl lactam with dicarboxylic acid and tetramethylene glycol.

A carbon number of a repeating unit in the polyamide of a hard segment part and a chemical structure of a repeating unit in the soft segment part and a ratio of hard to soft segments, as well as a molecular weight of each block can be arbitrarily designed from a viewpoint of flexibility and elastic recovery.

(3) Polyamide alloy (3.1) Polyamide/polyolefin-based alloy

For example, ZYTEL ST manufactured by Dupont, LEONA 4300 manufactured by Asahi Chemical Industry Co., Ltd., NOPAMID ST220 manufactured by Mitsubishi Chemical Corp., and NYLON EX1020 manufactured by Unitika Ltd.

(3.2) Polyamide/polypropylene-based alloy

For example, SYSTEMER S manufactured by Showa Denko Ltd.

(3.3) Polyamide/ABS-based alloy

For example, TYORACK SX manufactured by Toray Ltd.

(3.4) Polyamide/polyphenylene ether-based alloy

For example, NOLYL GTX600 manufactured by Japan GE Plastics K. K., and LEMALLOY B40 manufactured by Mitsubishi Chemical Corp.

(3.5) Polyamide/polyarylate-based alloy

For example, X9 manufactured by Unitika Ltd.

A laminate 1 comprising the fluorine-containing adhesive material (A-2) of the present invention and the organic material (B-1) can be laminated with (D) a layer comprising a fluorine-containing polymer free from carbonyl group-containing functional group on the fluorine-containing adhesive material (A-2) side.

In this case, a fluorine-containing adhesive material used as an adhesive layer for a laminate comprising these 3 layers preferably comprises a fluorine-containing ethylenic polymer which has a composition similar to that of the fluorine-containing polymer and which has a carbonyl group-containing functional group from a viewpoint of mutual adherability. The thickness of the three-layered laminate may be from 25 to 10,000 μm, preferably from 40 to 4,000 μm. The thickness of the fluorine-containing adhesive material layer (A-2) may be from 5 to 2,000 μm, preferably from 10 to 1,000 μm. The thickness of the layer (D) comprising the fluorine-containing polymer free from carbonyl group-containing functional group is from 10 to 5,000 μm, preferably from 15 to 3,000 μm. The thickness of the organic material (B-1) is from 10 to 5,000 μm, preferably from 15 to 3,000 μm.

That is, it is a laminate comprising:
(A-3) a layer comprising the aforementioned fluorine-containing adhesive material,
(D-2) a layer comprising a fluorine-containing polymer free from a carbonyl group-containing functional group, and
(B-2) a layer comprising the aforementioned organic material,
wherein the layer (A-3) is positioned between the layers (D-2) and (B-2) to give an adhesive layer, and can effectively impart the excellent properties of the fluorine-containing polymer to the organic material.

In the laminate comprising the fluorine-containing adhesive material (A-3) of the present invention, the fluorine-containing polymer (D-2) and the organic material (B-2), a reinforcing agent, a filler, a stabilizer, an ultraviolet absorbing agent, a pigment and other additives can be suitably contained in each layer in such a range that dose not deteriorate the adherability and properties of the fluorine-containing polymer and the organic material. Such additives can improve heat stability, surface hardness, abrasion resistance, weatherability, electrification and other properties.

By the way, polyamides are excellent in high strength, high toughness and processability and are widely used for a hose, tube and pipe. On the other hand, although they are excellent also in resistance to oil, their resistance to an alcoholic solvent is less. In particular, when a gasoline containing a lower alcohol is used, the resistance to oil (resistance to gasohol) is deteriorated vigorously to cause volumetric expansion, fuel penetration and even deterioration of mechanical strength of the material.

Therefore, the polyamide and the fluorine-containing polymer are laminated and, thereby, improvement of resistance to gasohol and utilization of a tube for fuel piping are sought and various studies have been hitherto conducted. For example, for obtaining a laminate tube of a polyamide and ETFE by coextrusion and the like, a composition comprising a polyamide and ETFE was used as an adhesive layer (WO95/11940 pamphlet, WO96/29200 pamphlet). However, these adhesive layer materials are a composition comprising polyamide and ETFE and they themselves are insufficient in heat-resistance, chemical resistance and solvent resistance. In addition, adhesion between a polyamide and the adhesive layer is not caused via a reaction but by only anchor effect, so that the adhesion strength is easily affected by the morphology of an adhesive layer composition. As a result, the laminate has the problem that the adhesion strength easily changes at a great extent by even small change of extrusion conditions and a temperature used.

The fluorine-containing adhesive material of the present invention firmly adheres to also a polyamide and, thus, can provide a laminate by which the aforementioned problems have been overcome.

Therefore, a multilayer tube or hose obtained by shaping the laminate comprising a layer comprising a polyamide and a layer comprising the fluorine-containing adhesive material of the present invention into a tubular shape can be effectively utilized as a tube or hose for piping fuel and liquid chemicals.

Preferable embodiments of the multilayer tube or hose having a layer comprising the polyamide include:
i) a multilayer tube or hose in which a laminate comprising:
 (A-4) a layer comprising a fluorine-containing adhesive material comprising the aforementioned polymer (I), and
 (B-3) a layer comprising polyamide is formed into a tubular shape, wherein the layer (A-4) is an internal layer;
ii) a multilayer tube or hose in which a laminate comprising:
 (A-4) a layer comprising a fluorine-containing adhesive material comprising the aforementioned copolymer (I),
 (D-3) a layer comprising an ethylene/tetrafluoroethylene coplymer (ETFE), and
 (B-3) a layer comprising a polyamide
 is formed into a tubular shape, wherein the layer (D-3) is an innermost layer;
iii) a multilayer tube or hose in which a laminate comprising:
 (A-4) a layer comprising a fluorine-containing adhesive material comprising the aforementioned copolymer (II), and
 (B-3) a layer comprising a polyamide is formed into a tubular shape, wherein the layer (A-4) is an internal layer;
iv) a multilayer tube or hose in which a laminate comprising:
 (A-4) a layer comprising a fluorine-containing adhesive material comprising the aforementioned copolymer (II),
 (D-3) a layer comprising PVdF or a VdF-based copolymer, and
 (B-3) a layer comprising a polyamide is formed into a tubular shape, wherein the layer (D-3) is an innermost layer;
v) a multilayer tube or hose in which a laminate comprising:
 (B-3) a layer comprising a polyamide
 (A-4) a layer comprising a fluorine-containing adhesive material comprising the aforementioned copolymer (I) or (II), and
 (B-3) a layer comprising a polyamide is formed into a tubular shape, wherein the layer (A-4) is positioned as an intermediate layer between two layers (B-3).

The above-mentioned filler, reinforcing agent and additives can be-added to each layer of these multilayer tubes or hoses in such a range that does not deteriorate their objective properties. When, partilularly used as the fuel piping material or the liquid chemical tube, a filler which imparts the electrical conductivity is preferably added to internal layers ((A-4) and (D-3)) of a fluorine-containing polymer.

Preferable embodiments of the multilayer tube or hose having a layer comprising the polyamide include:
vi) a multilayer tube or hose in which a laminate comprising:
 (A-4) a layer comprising a fluorine-containing adhesive material comprising the aforementioned copolymer (I), and (D-3) a layer comprising an ethylene/tetrafluoroethylene copolymer (ETFE),
(E-3) a layer comprising an ethylene/tetrafluoroethylene copolymer (ETFE) and a filler imparting electrical conductivity,
(B-3) a layer comprising polyamide is formed into a tubular shape, wherein the layer (E-3) is an innermost layer;
vii) a multilayer tube or hose in which a laminate comprising:
(A-4) a layer comprising a fluorine-containing adhesive material comprising the aforementioned copolymer (I), and
(D-3) a layer comprising PVdF or a VdF copolymer,
(E-3) a layer comprising PVdF or a VdF copolymer and a filler imparting electrical conductivity,
(B-3) a layer comprising polyamide is formed into a tubular shape, wherein the layer (E-3) is an innermost layer;

In the embodiments vi) and vii), the layers may be positioned in the order of (E-3)/(D-3)/(A-4)/(B-3) from the innermost.

Effect on resistance to fuels and various solvents for the embodiments vi) and vii) can be controlled by thickening the layer (D-3), thereby enabling the electrically conductive layer (E-3) to be as thin as possible so that the decrease of impact resistance of the layer (E-3) particularly at low temperature, which is caused by the incorporation of the filler imparting electrically conductivity, can be minimized. That is, the embodiments vi) and vii) have more excellent impact resistance in comparison with the case that the innermost layer is made electrically conductive by adding the filler imparting electrically conductivity to the layer (D-3) in the embodiments ii) and iv).

The multilayer tube and hose of the present invention can be shaped into necessary shape by various post-treatment. The multilayer tube and hose can be shaped into L-shape and U-shape and into a corrugated pipe, by adding a necessary part such as a connector or by a bending process.

The multilayer tube and hose of the present invention may have a protective layer (F) protecting the tube and hose at the outside of the tube and hose. When the layer (F) comprises a melt-processable material, the layer (F) is co-extruded with the multilayer or is shaped and laminated in a step different from a shaping step of the multilayer tube or hose. A material constituting the layer (F) is not limited as so far as the material has the function of protecting the multilayer tube and hose, for example, has insulating properties and impact absorbing properties.

Further, a preferable embodiment of a laminate comprising the fluorine-containing adhesive material of the present invention is a laminate comprising:
(A-5) a layer comprising the aforementioned fluorine-containing adhesive material (A), and
(B-4) a layer comprising an ethylene polymer.

In the context of the present invention, the "ethylene polymer" means a thermoplastic polymer containing ethylene as a main constituent monomer and it is preferable that an ethylene unit is at least 20% by mol, particularly at least 30% by mol, for example, 50% by mol. The ethylene polymer layer (B-4) preferably has a functional group having reactivity or affinity with the aforementioned carbonate group or carboxylic acid halide group. More particularly, preferable examples are epoxy-modified polyethylene, an ethylene/vinyl acetate copolymer, an ethylene/vinyl alcohol copolymer, an ethylene/maleic anhydride copolymer and an ethylene/acrylic acid derivative copolymer. These laminates can be shaped into various shapes as in described above. Inter alia, when shaped into a tank shape, it can be utilized as a gasoline tank for automobiles, for which the application of a resin has been progressed recently, and fuel permeability can be improved and heat-resistance can be imparted. More particularly, examples are preferably:

i) a laminate comprising:
(A-5) a fluorine-containing adhesive material comprising the aforementioned polymer (I) or (III), and
(B-4) an ethylene polymer, which is formed into a tank, wherein the adhesive material (A-5) is positioned on an internal layer side; and ii) a laminate comprising:
(B-4) an ethylene polymer,
(A-5) a fluorine-containing adhesive material comprising the aforementioned polymer (I) or (II) or (III), and
(B-4) an ethylene polymer, which is shaped into a tank, wherein the adhesive material (A-5) is positioned between two layers (B-4).

Further, when a laminate comprising the fluorine-containing adhesive material of the present invention and the ethylene polymer is shaped into a bottle shape, it can be employed, for example, as a so-called chemical liquid bottle used for storing and transporting various liquid compounds (chemical liquids) due to excellent chemical resistance of a fluorine-containing polymer. Because a chemical liquid used in a process of preparing semiconductors is required to maintain high purity by preventing eluation of components from a bottle, the present invention is particularly useful for this use.

More particularly, preferable is
i) a laminate comprising:
(A-5) a fluorine-containing adhesive material comprising the aforementioned polymer (I) or (III), and
(B-4) an ethylene polymer, which has been shaped into a bottle, particularly wherein the adhesive material (A-5) is positioned on an internal layer side. In particular, a laminate in which the layer comprising aforementioned polymer (III) is positioned in an internal layer is preferable.

A process for preparing the laminate 1 of the present invention is appropriately selected depending upon a type and form of a fluorine-containing adhesive material and a type and shape of an organic material.

For example, adopted are a method of preparing a fluorine-containing adhesive film using a fluorine-containing adhesive material, laying a shaped article of an organic material on the adhesive film and laminating by thermal activation by heating as described above; a method of converting a fluorine-containing adhesive material into a coating agent such as an aqueous or organic solvent dispersion, an organic solvent solution and a powder, which is coated on an organic material and thermally activated by heating; an insert molding method and; a coextrusion method, when the fluorine-containing adhesive material of the present invention is laminated with a melt-shapable thermoplastic polymer.

The laminate of the present invention can be shaped into various shapes such as a hose, a pipe, a tube, a sheet, a seal, a gasket, a packing, a film, a tank, a roller, a bottle and a container by these methods.

Further, the present invention relates to a process for manufacturing a multilayer shaped laminate article which comprises shaping a fluorine-containing adhesive material (A) having a carbonyl group-containing functional group and an organic material (B) by coextrusion at a shaping temperature, that is, at such a temperature that a resin temperature at shaping exceeds a crystal melting point or glass transition point of each material. That is, since the adhesion between the materials (A) and (B) and the shaping into the desired shape can be accomplished at the same time and continuously by melt coextrusion, the productivity is preferably excellent and the adhesion performance is preferably better.

It is preferable that in order to impart excellent interlayer adhesion strength, in the present process, the fluorine-containing adhesive material (A) and the organic material (B) are both selected from thermoplastic resins having a crystal melting point or a glass transition point of at most 270° C., preferably thermoplastic resins having a crystal melting point or a glass transition point of at most 230° C.

Further, from viewpoint of interlayer adhesion strength between the materials (A) and (B) and the better appearance of a shaped article, a shaping temperature, that is, a resin temperature at shaping is limited to at most 350° C., preferably at most 300° C.

When a shaping temperature (a resin temperature) is less than a melting point or glass transition temperature of the fluorine-containing adhesive material (A) having carbonyl group-containing functional group or the organic material (B), either of the fluorine-containing adhesive material (A) or the organic material (B) does not have sufficient fluidity, so that the sufficient adhesion between the materials (A) and (B) can not be accomplished and defective appearance such as surface roughening of a shaped article is caused.

In addition, if a shaping temperature is too high, insufficient adhesion between the materials (A) and (B) and peeling are undesirably caused, foaming and surface roughening not only on a surface of a shaped article but also at an interface between the materials (A) and (B) are caused, and the worse appearance such as coloration are undesirably caused.

The present inventors now further discovered that a shaped article having the firm interlayer adhesion strength between the layers (A) and (B) and also the excellent appearance and quality can be prepared in the better productivity by shaping, in a melt coextrusion, the fluorine-containing adhesive material (A) and the thermoplastic resin (B) having a crystal melting point of at most 230° C. at a shaping temperature which exceeds a crystal melting point of each material and is at most 300° C.

A second laminate of the present invention (hereinafter referred to as "laminate 2") is a laminate comprising:
  (A-5) a layer comprising the fluorine-containing adhesive material (A), and
  (C-1) a layer comprising an inorganic material.

The thickness of the laminate 2 may be from 15 to 10,000 $\mu$m, preferably from 25 to 4,000 $\mu$m. The thickness of the fluorine-containing adhesive material layer (A-5) may be from 1 to 2,000 $\mu$m, preferably from 3 to 1,000 $\mu$m. The thickness of the inorganic material layer (C-1) may be from 0.1 to 9,000 $\mu$m, preferably from 1 to 3,000 $\mu$m.

Examples of the inorganic material layer (C-1) are a metal-based material and a non-metal inorganic material.

The metal-based material includes a metal and an alloy of at least two metals, a metal oxide, a metal hydroxide, and a metal salt such as a carbonate and a sulfate. Inter alia, the metal, the metal oxide and the alloy are preferable in view of the adherability.

In the laminate of the present invention, examples of the metal-based material (C-1) are a metal such as aluminum, iron, nickel, titanium, molybdenum, magnesium, manganese, copper, silver, lead, tin, chromium, beryllium, tungsten and cobalt, and a metal compound, and an alloy of at least 2 of them. The metal-based material can be selected depending upon purpose and application.

Examples of the alloy are alloy steel such as carbon steel, Ni steel, Cr steel, Ni—Cr steel, Cr—Mo steel, stainless steel, silicon steel and permalloy, an aluminum alloy such as Al—Cl, Al—Mg, Al—Si, Al—Cu—Ni—Mg, and Al—Si—Cu—Ni—Mg, a copper alloy such as brass, bronze, silicon bronze, silicon brass, nickel silver, and nickel bronze, and a nickel alloy such as nickel manganese (D nickel), nickel-aluminum (Z nickel), nickel-silicon, Monet metal, constantan, nichrome Inconel, and Hastelloy.

In order to prevent the corrosion of metal, the surface of metal may be coated with the other metal by electroplating, hot-dip plating, chromizing, siliconizing, calorizing, sherardizing and thermal spraying, a phosphate salt coating may be formed on the surface of metal by phosphate salt treatment, a metal oxide may be formed on the surface of metal by anodizing or heat oxidation, and the surface of metal may be treated by electrochemical corrosion prevention.

In order to further improve the adherability, the surface of metal may be chemically treated with phosphate salt, sulfuric acid, chromic acid and oxalic acid, the surface of metal may be treated by surface roughening treatment such as sandblast, shotblast, gritblast, honing, paperscratch, wirescratch and hairline treatment and, for the purpose of decorative design, the surface of metal may be treated by coloration, printing and etching.

In addition, from a view that the better adherability can be expected and the excellent function by lamination with a fluorine-containing polymer are sought, an aluminum-based metal material, an iron-based metal material and a copper-based metal material are preferable.

As the non-metal material, mentioned are a glass material such as crystallized glass, foamed glass, heat ray reflecting glass, heat ray absorbing glass and multilayered glass, ceramic material such as tile, large-sized porcelain plate, ceramic panel and brick, natural stone such as granite and marble, a concrete material such as high strength concrete, glass fiber reinforced concrete (GRC), carbon fiber reinforced concrete (CFRC), air bubble expanded concrete (ALC) and composite ALC, a cement material such as extruded cement and composite shaped cement, and other materials such as an asbestos slate, a porcelain enamel steel plate, single crystal silicon, polycrystalline silicon, amorphous silicon, clay, a boron-based material, and a carbon-based material. Among them, a glass material is preferable in that it is the better in the adherability and imparts the excellent function by lamination with the fluorine-containing polymer.

Preferable embodiments of a combination in the laminate 2 comprising the fluorine-containing adhesive material (A-5) of the present invention and the inorganic material (C-1) are set forth below:
  i) a laminate comprising:
    (A-5) a layer comprising a fluorine-containing adhesive material comprising the aforementioned copolymer (I), (II) or (III) and
    (C-1) a layer comprising an aluminum-based metal material.

In this case, pure aluminum, aluminum oxide, an aluminum alloy for casting or flattening such as Al—Cu, Al—Si, Al—Mg and Al—Cu—Ni—Mg and Al—Si—Cu—Ni—Mg-based alloy, high strength aluminum alloy, and corrosion-resistant aluminum alloy can be used as the aluminum-based metal material. The aluminum-based metal material (anodized aluminum) obtained by forming an oxidized film on the surface of the aforementioned aluminum or aluminum alloy by anodic oxidation using sodium hydroxide, oxalic acid, sulfiric acid or chromic acid in order to improve the corrosion protection, the surface hardness and adherability, or the aluminum-based metal material obtained by the aforementioned surface treatment can be used.

ii) A laminate comprising:
   (A-5) a layer comprising a fluorine-containing adhesive material comprising the aforementioned copolymer (I), (II) or (III), and
   (C-1) a layer comprising an iron-based metal material.

In this case, as the iron-based metal material, pure iron, iron oxide, carbon steel, Ni steel, Cr steel, Ni—Cr steel, Cr—Mo steel, Ni—Cr—Mo steel, stainless steel, silicon steel, permalloy, insensitive magnetic steel, magnet steel and cast iron steel can be used.

In the same manner as described above, a material having the surface plated with the other metal, for example, fused zinc-plated steel plate, alloyed fused zinc-plated steel plate, aluminum-plated steel plate, zinc nickel-plated steel plate and zinc aluminum-plated steel plate, a material coated with the other metal by a penetration method or a thermal spraying method, a material with an oxidized film formed by chemical treatment with chromic acid or phosphoric acid or heat treating, and a material treated by electrical corrosion prevention (for example, galvanic steel plate) can be used.

The laminates i) and ii) are preferable in that they can impart resistance to corrosion, rust proofness, chemical resistance, weatherability, unstickness and tribological property to aluminum-based materials and iron-based materials, respectively, and can be used in construction materials, chemical plants, food processing, cooking machines, housing facility machines, appliance related parts, automobile related parts, and OA related parts.

iii) A laminate comprising:
   (A-5) a layer comprising a fluorine-containing adhesive material comprising the aforementioned copolymer (III), and
   (C-1) a layer comprising a copper-based metal material.

This laminate is preferable because it has low water absorption, imparts the excellent electrical properties of a fluororesin to a copper-based material, and can be used in electric or electronic related application such as printed boards and electric or electronic parts.

iv) A laminate comprising:
   (A-5) a layer comprising a fluorine-containing adhesive material comprising the aforementioned copolymer (I), (II) or (III) and
   (C-1) a layer comprising a glass-based material.

This laminate has transparency, imparts water repellency, oil repellency, reflection prevention, and low refractive index to the surface of a glass, and can be used in optical related parts, liquid crystal related parts, construction glasses, cooking machine-related parts and automobile glasses. In addition, the laminate plays a role on prevention of glass breakage and can be used in illumination related machines and non-combustible fire preventive safety glass, being preferable.

v) A laminate comprising:
   (A-5) a layer comprising a fluorine-containing adhesive material comprising the aforementioned copolymer (I), (II) or (III), and
   (C-1) a layer comprising a silicon-based material such as single crystal or polycrystalline silicon or amorphous silicon.

This laminate has transparency, imparts weatherability, soil releasability and damage prevention to the surface, and can be used for a solar cell having the surface or back covered with a fluororesin, being preferable.

A fluorine-containing polymer (D-4) free from carbonyl group-containing functional group can be laminated on the adhesive side of the laminate 2 comprising the fluorine-containing adhesive material (A-5) of the present invention and the inorganic material (C-1).

The thickness of the three-layered laminate may be from 10 to 10,000 $\mu$m, preferably from 15 to 4,000 $\mu$m. The thickness of the layer (A-5) of the fluorine-containing adhesive material may be from 1 to 2,000 $\mu$m, preferably from 3 to 1,000 $\mu$m. The thickness of the layer (D-4) of the fluorine-containing polymer free from carbonyl group-containing functional groul may be from 5 to 5,000 $\mu$m, preferably from 10 to 3,000 $\mu$m. The thickness of the layer (C-1) of the inorganic material may be from 0.1 to 5,000 $\mu$m, preferably from 1 to 3,000 $\mu$m.

That is, one laminate of the present invention is a laminate comprising:
   (A-6) a layer comprising the aforementioned fluorine-containing adhesive material,
   (D-4) a layer of a fluorine-containing polymer free from carbonyl group-containing functional group, and
   (C-2) a layer comprising an inorganic material, wherein the layer (A-6) is positioned between the layer (D-4) and the layer (C-2), to form an adhesive layer. This laminate can effectively impart the excellent properties of the fluorine-containing polymer to an inorganic material.

In this case, it is preferable in view of the mutual adherability that the fluorine-containing adhesive material (A-6) used in an adhesive layer of the laminate 2 comprising these 3 layers comprises a fluorine-containing ethylenic polymer which has similar composition to that of the fluorine-containing polymer (D-4) and which contains a carbonyl group-containing functional group.

In the laminate comprising the inorganic material (C-2) of the present invention, a suitable reinforcing agent, a filler, a stabilizer, an ultraviolet absorbing agent, a pigment and other additive may be suitably contained in the fluorine-containing adhesive material (A-6) and the fluorine-containing polymer layer (D-4) as far as the adherability and other properties of the fluorine-containing polymer are not deteriorated. Such additives can improve thermal stability, surface hardness, abrasion resistance, weatherability, electrification and other properties.

A process for manufacturing the laminate 2 of the present invention is appropriately selected depending upon a type and form of the fluorine-containing adhesive material, and a type and shape of the inorganic material.

For example, a method of preparing a fluorine-containing adhesive film using a fluorine-containing adhesive material, laying on an inorganic material and laminating by thermal activation by heating as described above; a method of preparing a fluorine-containing adhesive material in the form of a coating agent such as an aqueous or organic solvent dispersion, an organic solvent solution and a powder, which is coated on the inorganic material and thermally activated by heating; and an insert shaping method can be adopted.

The laminate 2 of the present invention can be shaped into the shape such as a hose, a pipe, a tube, a sheet, a seal, a gasket, a packing, a film, a tank, a roller, a bottle and a container by these method.

PREFERRED EMBODIMENTS OF INVENTION

The present invention will be illustrated with referring to Reference Examples and Examples but is not limited to them.

In the following Reference Examples and Examples, the following measurements were carried out.
(1) Number of carbonate groups Cut pieces of extruded pellets and white powders of the resultant fluorine-containing polymer were compression molded at a room temperature to form a film having the thickness of from 0.05 to 0.2 mm. By infrared spectrometry of the film, an absorbance of the peak at 1809 cm$^{-1}$ which is assigned to a carbonyl group of a carbonate group (—OC(=O)O—) was measured. The number (N) of carbonate groups per 10$^6$ main chain carbon atoms was calculated according to the following equation (1):

$$N=500\ AW/\epsilon df \tag{1}$$

A: absorbance of 1809 cm$^{-1}$ peak assigned to a carbonate group (—OC(=O)O—),

ϵ: molar absorbance coefficient of 1809 cm$^{-1}$ peak assigned to a carbonate group (—OC(=O)O—) [1·cm$^{-1}$·mol$^{-1}$] (here, ϵ=170 is adopted in view of a model compound), W: composition average monomer molecular weight calculated from monomer composition, d: density of a film [g/cm$^3$], and f: thickness of a film [mm].

Infrared absorption spectrometry was measured by scanning 40 times using Perkin-Elmer FTIR spectrometer 1760X (manufactured by Perkin Elmer). The baseline of the resultant IR spectrum was automatically determined with Perkin-Elmer spectrum for Windows Ver. 1.4C and the absorbance A of a peak of 1809 cm$^{-1}$ was calculated. The thickness of the film was measured with a micrometer.

(2) Number of carboxylic acid fluoride groups

By infrared spectrometry of a film obtained according to the same manner as in the above-mentioned (1), an absorbance of the peak at 1880 cm$^{-1}$ which is assigned to a carbonyl group of a carboxylic acid fluoride group (—C(=O)F) was measured. The number of carboxylic acid fluoride groups was calculated using the equation (1) according to the same manner as in the above-mentioned (1) except that ϵ=600 was used as molar absorbance coefficient [1·cm$^{-1}$·mol$^{-1}$] assigned to the carboxylic acid fluoride group, in view of a model compound.

(3) Composition of polymer

Measurement was carried out by $^{19}$F-NMR analysis.

(4) Melting point (T$_m$)

Using Seiko type DSC apparatus, a melting peak when a temperature was raised at 10° C./min. was recorded and a temperature corresponding to a maximum of a melting peak was taken as a melting point (T$_m$).

(5) MFR (melt flow rate)

Using a melt indexer (manufactured by Toyo Seiki K.K.), a weight (g) of a polymer which was flown out per unit time (10 min.) through a nozzle having a diameter of 2 mm and a length of 8 mm at a given temperature and under a load of 5 kg was measured.

(6) Adhesion strength

A test piece having a width of 1 cm was cut from a tube, and a 180 degree peeling test was carried out at 25 mm/min. using Tensilon universal testing machine. A maximum five points average in a graph of elongation vs. tensile strength was determined as an adhesion strength between an outer layer and an intermediate layer.

(7) Appearance of peeled surfaces

A peeled surface of an outer layer of the resultant multi-layer tube sample having a debond between the outer layer and the intermediate layer was visually observed. The uniform debond is classified as "Good". Irregular debond is classified as "Fair" and "Bad". The "Fair" shows that the peeled surface is partially roughened. The "Bad" shows that the peeled surface is roughened as whole. When the peeled surface is rough, good adhesion strength cannot be generally obtained. It is believed that this is dependent on the evolution of gas during the shaping.

SYNTHESIS EXAMPLE 1

Synthesis of a Fluorine-containing Polymer Having a Carbonate Group

200 L of pure water was charged into a glass-lined autoclave having an internal volume of 820 L and an internal atmosphere of the autoclave was sufficiently replaced with a nitrogen gas. After vacuuming, 113 kg of 1-fluoro-1,1-dichloroethane, 95 kg of hexafluoropropylene and 85 kg of cyclohexane were charged therein. Then, 292 g of perfluoro (1,1,5-trihydro-1-pentene) represented by the formula (iii):

$$CH_2=CF(CF_2)_3H \tag{iii}$$

was injected with a nitrogen gas to give a pressure of 7.25 kg/cm$^2$G. Then, ethylene was injected to give a pressure of 8 kg/cm$^2$G.

Then, 1.9 kg of a 50% solution of di-n-propylperoxydicarbonate in methanol was charged to initiate a polymerization. Since a pressure in the reactor was lowered as the polymerization proceeded, a mixture gas of tetrafluoroethylene/ethylene/hexafluoropropylene (molar ratio=39.2:43.6:17.3) was additionally injected therein to maintain the pressure at 12 kg/cm$^2$G. During the polymerization, 1,100 g of the compound represented by the formula (iii) was charged therein in 20 portions with a micropump. The polymerization was performed for total 32 hours.

After completion of the polymerization, the product was recovered, washed with water, filtered and vacuum dried 80° C. for 8 hours to give 95 kg of a powdery polymer. The physical properties of the resultant polymer are shown in Table 1.

SYNTHESIS EXAMPLE 2

Synthesis of a Fluorine-containing Polymer Having a Carbonate Group

400 L of pure water was charged to a 1,000 L stainless autoclave, the interior of the autoclave was sufficiently substituted with a nitrogen gas. After vacuuming, 262 kg of perfluorocyclobutane was charged. Then, 2.36 kg of perfluoro(1,1,5-trihydro-1-pentene) of the formula (iii) was injected therein using a nitrogen gas and a temperature of the interior of the autoclave and a stirring speed were maintained at 20° C. and 180 rpm, respectively.

Tetrafluoroethylene was injected to give a pressure of 8.57 kg/cm$^2$G and then ethylene was injected to give a pressure of 9.13 kg/cm$^2$G. Then, the internal temperature and pressure of the autoclave were brought to 35° C. and 12 kg/cm$^2$G, respectively.

Then, 2.3 kg of a 50% solution of di-n-propylperoxydicarbonate in methanol was charged to initiate a polymerization reaction. Since an internal pressure of the autoclave was lowered as the polymerization reaction proceeded, a mixture gas of tetrafluoroethylene/ethylene (molar ratio=66:34 % by mol) was additionally injected therein to continue the polymerization while maintaining the pressure of the system at 12 kgf/cm$^2$G. During the polymerization, 2.4 kg of the compound of the formula (iii) was supplied continuously with a micropump to conduct the polymerization for 15 hours.

After completion of the polymerization, the product was recovered, washed with water, filtered and vacuum dried 80° C. for 8 hours to give 33.9 kg of a powdery polymer. The physical properties of the resultant polymer are shown in Table 1.

SYNTHESIS EXAMPLE 3

Synthesis of a Fluorine-containing Polymer Having a Carbonate Group and a Carboxylic Acid Fluoride Group The powder obtained in Synthesis Example 1 was charged in an single axial extruder (VS 50-24 manufactured by Tanabe Plastic Kikai K.K.) (L/D=24) (screw diameter: 50 mm), and extruded at a cylinder temperature of from 300° C. to 320° C. and a resin temperature near die of 320° C. to give pellets. The physical properties of the resultant polymer are shown in Table 1.

SYNTHESIS EXAMPLE 4

Synthesis of a Fluorine-containing Polymer Having a Carbonate Group and a Carboxylic Acid Fluoride Group Pellets were given from the polymer powder obtained in Synthesis Example 1, in the same procedure as in Synthesis Example 3 except that the cylinder temperature was from 320° C. to 350° C. and the resin temperature near die was 350° C. The physical properties of the resultant polymer are shown in Table 1.

SYNTHESIS EXAMPLE 5

Synthesis of a Fluorine-containing Polymer Having a Carbonate Group and a Carboxylic Acid Fluoride Group Pellets were given from the polymer powder obtained in Synthesis Example 2, in the same procedure as in Synthesis Example 4. The physical properties of the resultant polymer are shown in Table 1.

SYNTHESIS EXAMPLE 6

Synthesis of a Fluorine-containing Polymer Free From a Carbonyl Group-containing Functional Group 95 kg of polymer powder synthesized in Synthesis Example 1 and 100 L of pure water were charged into a 500 L stainless autoclave. 7 kg of 28 % ammonia water was added and the mixture was heated at 80° C. for 5 hours with stirring. The powder in the autoclave was removed, washed with water, filtered and vacuum dried 80° C. for 8 hours to give 93 kg of a powdery polymer. The physical properties of the resultant polymer are shown in Table 1.

SYNTHESIS EXAMPLE 7

Synthesis of a Fluorine-containing Polymer Having a Carbonate Group 195.4 L of pure water was charged into a glass-lined autoclave having an internal volume of 820 L and an internal atmosphere of the autoclave was sufficiently replaced with a nitrogen gas. After vacuuming, 445.4 kg of perfluorocyclobutane, 83.0 kg of perfloromethyl vinyl ether and 30.3 kg of tetrafluoroethylene were charged therein. An internal temperature of the autoclave and a stirring speed were maintained at 35° C. and 150 rpm, respectively. Then, 1.0 kg of a 50% solution of di-n-propylperoxydicarbonate in methanol was injected with a nitrogen gas to initiate a polymerization.

Since a pressure in the reactor was lowered as the polymerization proceeded, a mixture gas of tetrafluoroethylene/perfluoromethyl vinyl ether (a molar ratio=85:15) was additionally injected therein to maintain the pressure at 7 kgf/cm$^2$ (gage pressure). The polymerization was conducted for 34 hours.

After completion of the polymerization, the product was recovered, washed with water, filtered and vacuum dried 70° C. for 10 hours to give 64 kg of a powdery polymer.

The powdery polymer was charged in an single axial extruder (VS 50-24 manufactured by Tanabe Plastic Kikai K.K.) (LJD=24) (screw diameter: 50 mm), and extruded at a cylinder temperature of from 230° C. to 240° C. and a resin temperature near die of 2580° C. to give pellets. The physical properties of the resultant pellets are shown in Table 1.

SYNTHESIS EXAMPLE 8

Synthesis of a Fluorine-containing Polymer Having a Carbonate Group

273 L of pure water was charged into a glass-lined autoclave having an internal volume of 820 L and an internal atmosphere of the autoclave was sufficiently replaced with a nitrogen gas. After vacuuming, 164 kg of hexafluoropropylene and 1.5 kg of tetrafluoroethylene were charged therein. An internal temperature of the autoclave and a stirring speed were maintained at 65° C. and 200 rpm, respectively. Then, 8 kg of a 50% solution of di-n-propylperoxydicarbonate in methanol was injected with a nitrogen gas to initiate a polymerization.

Since a pressure in the reactor was lowered because of the consumption of gaseous monomers as the polymerization proceeded, a mixture gas of tetrafluoroethylene/hexafluoropropylene (a molar ratio=86.5:13.5) was additionally injected therein to maintain the pressure at 4.5 kgf/cm$^2$ (gage pressure). The polymerization was conducted for 60 hours. In correspondence to the deactivation of di-n-propylperoxydicarbonate, 4 kg of a 50% solution of di-n-propylperoxy-dicarbonate in methanol was added every 30 hours.

After completion of the polymerization, the product was recovered, washed with water, filtered and vacuum dried 80° C. for 8 hours to give 15 kg of a powdery polymer.

The powdery polymer was charged in an single axial extruder (VS 50-24 manufactured by Tanabe Plastic Kikai K.K.) (L/D=24) (screw diameter: 50 mm), and extruded at a cylinder temperature of from 230° C. to 240° C. and a resin temperature near die of 258° C. to give pellets. The physical properties of the resultant pellets are shown in Table 1.

TABLE 1

| | Monomer composition (mol %) TFE/Et/HFP/compound of formula (iii)/compound of formula (i) | Number of groups per $10^6$ main chain carbon atoms | | Melting point (° C.) | MFR [g/10 min] (Measurement temperature) |
|---|---|---|---|---|---|
| | | Carbonate group | Carboxylic acid fluoride group | | |
| Syn. Ex. 1 | 38.9/45.9/14.8/0.4/0 | 411 | Not detected | 171.8 | 7.1 (230° C.) |
| Syn. Ex. 2 | 63.5/33.4/0/3.1/0 | 556 | Not detected | 209.7 | 18.4 (297° C.) |
| Syn. Ex. 3 | 38.9/45.9/14.8/0.4/0 | 128 | 10 | 171.8 | 7.1 (230° C.) |
| Syn. Ex. 4 | 38.9/45.9/14.8/0.4/0 | 57 | 30 | 171.8 | 7.1 (230° C.) |
| Syn. Ex. 5 | 63.5/33.4/0/3.1/0 | 68 | 38 | 209.7 | 18.4 (297° C.) |
| Syn. Ex. 6 | 38.9/45.9/14.8/0.4/0 | Not detected | Not detected | 171.8 | 7.1 (230° C.) |
| Syn. Ex. 7 | 85.3/0/0/0/14.7 | 143 | Not detected | 209.5 | 12.5 (265° C.) |
| Syn. Ex. 8 | 86.5/0/13.5/0/0 | 135 | Not detected | 204.8 | 19.5 (297° C.) |

TFE: Tetrafluoroethylene
Et: Ethylene
HFP: Hexafluoropropylene
Compound of formula (iii): $CH_2=CF(CF_2)_3H$
Compound of formula (i): $CF_2=CFOCF_3$

REFERENCE EXAMPLE 1

Preparation of Pellets of a Fluorine-containing Polymer Having a Carbonate Group The powder obtained in Synthesis Example 1 was charged in an single axial extruder (VS 50-24 manufactured by Tanabe Plastic Kikai K.K.) (LJD=24) (screw diameter: 50 mm), and extruded at a cylinder temperature of from 190° C. to 235° C. and a resin temperature near die of 235° C. to give pellets. The resultant polymer had a carbonate group number of 381 per 1×10⁶ main chain carbon atoms, and a carboxylic acid fluoride group was not observed.

REFERENCE EXAMPLE 2

Preparation of Pellets of a Fluorine-containing Polymer Having a Carbonate Group Pellets were given from the polymer powder obtained in Synthesis Example 2, in the same procedure as in Reference Example 1 except that the cylinder temperature was from 230° C. to 240° C. and the resin temperature near die was 258° C. The resultant polymer had a carbonate group number of 524 per 1×10⁶ main chain carbon atoms, and a carboxylic acid fluoride group was not observed.

REFERENCE EXAMPLE 3

Preparation of Pellets of a Fluorine-containing Polymer Free From a Carbonyl Group-containing Functional Group Pellets were given from the polymer powder obtained in Synthesis Example 6, in the same procedure as in Reference Example 1. Each of a carbonate group and a carboxylic acid fluoride group was not observed.

EXAMPLE 1

Preparation of a Multilayered Tube

By using pellets of Polyamide-12 (UBE 3035 MI1 manufactured by Ube Industries Co., Ltd.) and pellets of the fluorine-containing polymer obtained in Synthesis Example 3, a multilayered tube (three layers) having an external diameter of about 8 mm and an internal diameter of about 6 mm wherein Polyamide 12 was disposed in an outer layer, a fluorine-containing polymer obtained in Synthesis Example 3 was disposed in an intermediate layer, and an electrically conductive ETFE (EP 610 AS manufactured by Daikin Industries Co., Ltd.) was disposed in an inner layer. The adhesion strength and the appearance of the adhesion interface after debond of the resultant multilayered tube were measured. The results are shown in Table 3.

EXAMPLE 2

A multilayered tube was prepared and measured in the same procedure as in Example 1 under the conditions shown in Table 2, except that the fluorine-containing polymer pellets obtained in Synthesis Example 4 were used instead of the fluorine-containing polymer pellets obtained in Synthesis Example 3. The results are shown in

EXAMPLE 3

A multilayered tube was prepared and measured in the same procedure as in Example 1 under the conditions shown in Table 2, except that the fluorine-containing polymer pellets obtained in Synthesis Example 5 were used instead of the fluorine-containing polymer pellets obtained in Synthesis Example 3. The results are shown in Table 3.

EXAMPLE 4

A multilayered tube was prepared and measured in the same procedure as in Example 1 under the conditions shown in Table 2, except that the fluorine-containing polymer pellets obtained in Synthesis Example 7 were used instead of the fluorine-containing polymer pellets obtained in Synthesis Example 3. The results are shown in Table 3.

EXAMPLE 5

A multilayered tube was prepared and measured in the same procedure as in Example 1 under the conditions shown in Table 2, except that the fluorine-containing polymer pellets obtained in Synthesis Example 8 were used instead of the fluorine-containing polymer pellets obtained in Synthesis Example 3. The results are shown in Table 3.

COMPARATIVE EXAMPLE 1

A multilayered tube was prepared and measured in the same procedure as in Example 1 under the conditions shown in Table 2, except that the fluorine-containing polymer pellets obtained in Reference Example 1 were used instead of the fluorine-containing polymer pellets obtained in Synthesis Example 3. The results are shown in Table 3.

COMPARATIVE EXAMPLE 3

A multilayered tube was prepared and measured in the same procedure as in Example 1 under the conditions shown in Table 2, except that the fluorine-containing polymer pellets obtained in Reference Example 3 were used instead of the fluorine-containing polymer pellets obtained in Synthesis Example 3. The results are shown in Table 3.

TABLE 2

|  | Example 1 | Example 2 | Example 3 | Example 4 | Example 5 | Com. Ex. 1 | Com. Ex. 2 | Com. Ex. 3 |
|---|---|---|---|---|---|---|---|---|
| Resin of intermediate layer | Syn. Ex. 3 | Syn. Ex. 4 | Syn. Ex. 5 | Syn. Ex. 7 | Syn. Ex. 8 | Ref. Ex. 1 | Ref. Ex. 2 | Ref. Ex. 3 |
| Resin of outer layer | | | | Polyamide 12 | | | | |
| Resin of inner layer | | | | Electrically conductive ETFE | | | | |
| Intermediate layer | | | | | | | | |
| Cylinder temperature (° C.) | 230 to 270 | 230 to 270 | 230 to 270 | 230 to 270 | 230 to 270 | 230 to 270 | 230 to 270 | 230 to 270 |
| Resin temperature (° C.) | 258 | 258 | 258 | 258 | 258 | 258 | 258 | 258 |
| Inner layer | | | | | | | | |
| Cylinder temperature(° C.) | 295 to 335 | 295 to 335 | 295 to 335 | 295 to 335 | 295 to 335 | 295 to 335 | 295 to 335 | 295 to 335 |
| Resin temperature (° C.) | 333 | 333 | 333 | 333 | 333 | 333 | 333 | 333 |
| Outer layer | | | | | | | | |
| Cylinder temperature (° C.) | 210 to 245 | 210 to 245 | 210 to 245 | 210 to 245 | 210 to 245 | 210 to 245 | 210 to 245 | 210 to 245 |
| Resin temperature (° C.) | 245 | 245 | 245 | 245 | 245 | 245 | 245 | 245 |
| Die temperature (° C.) | 280 | 280 | 280 | 280 | 280 | 280 | 280 | 280 |
| Draw speed of tube (m/min.) | 8.0 | 8.0 | 8.0 | 8.0 | 8.0 | 8.0 | 8.0 | 8.0 |

TABLE 3

|  | Example 1 | Example 2 | Example 3 | Example 4 | Example 5 | Com. Ex. 1 | Com. Ex. 2 | Com. Ex. 3 |
|---|---|---|---|---|---|---|---|---|
| Resin of intermediate layer | Syn. Ex. 3 | Syn. Ex. 4 | Syn. Ex. 5 | Syn. Ex. 7 | Syn. Ex. 8 | Ref. Ex. 1 | Ref. Ex. 2 | Ref. Ex. 3 |
| Resin of outer layer | | | | Polyamide 12 | | | | |
| Resin of inner layer | | | | Electrically conductive ETFE | | | | |
| Shape of tube | | | | | | | | |
| Outer diameter (mm) | 7.98 | 8.01 | 8.03 | 7.99 | 8.03 | 8.00 | 8.04 | 8.01 |
| Thickness of inner layer (mm) | 0.16 | 0.15 | 0.16 | 0.17 | 0.16 | 0.16 | 0.14 | 0.15 |
| Thickness of intermediate layer (mm) | 0.09 | 0.10 | 0.09 | 0.10 | 0.09 | 0.09 | 0.09 | 0.08 |
| Thickness of outer layer (mm) | 0.73 | 0.69 | 0.74 | 0.75 | 0.75 | 0.74 | 0.75 | 0.76 |
| Adhesion strength (N/cm) | 15.6 | 32.7 | 31.8 | 30.8 | 26.5 | 13.0 | 11.6 | 0.0*) |
| Appearance of peeled surface | Good | Good | Good | Good | Good | Bad (irregularity because of partial debond) | Bad (irregularity because of partial debond) | Bad (not adhered) |

*)Natural debond when the sample for debond test is cut from the tube.

COMPARATIVE EXAMPLE 2

A multilayered tube was prepared and measured in the same procedure as in Example 1 under the conditions shown in Table 2, except that the fluorine-containing polymer pellets obtained in Reference Example 2 were used instead of the fluorine-containing polymer pellets obtained in Synthesis Example 3. The results are shown in Table 3.

EXAMPLE 12

A multilayered tube was extruded by providing the fluorine-containing polymer pellets obtained in Synthesis Example 3 as a layer (A) and Nylon-12 (DAIAMID L 2101 manufactured by Daicel-Huels Co., Ltd.) as a layer (B) by means of an extrusion instrument (for preparing two layers in two type) equipped with a filed block-type coat hunger T die (a lip gap: 800 μm). The multilayered film was cooled by intimately contacting with a casting roll controlled at 20° C. The multilayered film having a thickness of 100 μm was continuously drawn. The shaping conditions and evaluation results of resultant film are shown in Table 4.

An appearance of the film was evaluated according to the following criteria:
Good: Defect of appearance is not observed at all.
Fair: Some Defect (flow mark, bubble, whitening, pin hole, etc.) arises on less than 10% of whole area.
Bad: Some Defect (flow mark, bubble, whitening, pin hole, etc.) arises on at least 10% of whole area.

An adherability of the film was evaluated according to the following criteria. 100 Pieces having a size of 5 cm×4 cm were cut from unintentional parts of the multilayered film by a keen cutter. Two layers were peeled off with hands. Good: Peeling could be done in none of 100 pieces. Fair: Peeling could be done in one to five pieces. Bad: Peeling could be done in at least 6 pieces.

EXAMPLE 7

The extrusion and evaluation of the multilayered film were conducted in the same manner as in Example 6, except that an ethylene/vinyl alcohol copolymer (EVAL F 101 manufactured by Kuraray Co., Ltd.) was used as the layer (B). The shaping conditions and evaluation results of multilayered film are shown in Table 4.

EXAMPLE 8

The extrusion and evaluation of the multilayered film were conducted in the same manner as in Example 6, except that a modified polyethylene resin (REXPEARL ET 182 manufactured by Japan Polyolefins Co., Ltd.) was used as the layer (B). The shaping conditions and evaluation results of multilayered film are shown in Table 4.

COMPARATIVE EXAMPLE 4

The extrusion and evaluation of the multilayered film were conducted in the same manner as in Example 7, except that the fluorine-containing polymer pellets obtained in Reference Example 3 was used as the layer (A). The shaping conditions and evaluation results of multilayered film are shown in Table 4.

TABLE 4

|  |  | Example No. | | | Com. Ex. |
| --- | --- | --- | --- | --- | --- |
|  |  | 6 | 7 | 8 | No. 4 |
| Cylinder temperature (° C.) | Layer A | 210 to 245 | 210 to 245 | 210 to 245 | 210 to 245 |
|  | Layer B | 160 to 245 | 170 to 225 | 150 to 200 | 170 to 225 |
| Die temperature (° C.) |  | 235 | 230 | 225 | 230 |
| Layer thickness (μm) | Layer A | 60 | 62 | 60 | 60 |
|  | Layer B | 40 | 38 | 41 | 38 |
| Appearance of film |  | Good | Good | Good | Bad |
| Adherability of film |  | Good | Good | Good | Bad |

EFFECT OF THE INVENTION

The fluorine-containing adhesive material of the present invention can be firmly adhered to a substrate such as a polyamide by a heat melt adhesion. Since the fluorine-containing polymer can impart the excellent properties such as chemical resistance, weather resistance and soil releasability to a laminate surface, the present invention can provide various laminates and shaped articles having low cost and high functionality.

What is claimed is:

1. A fluorine-containing adhesive material comprising a fluorine-containing ethylenic polymer having a carbonate group and/or a carboxylic acid halide group at a chain end or a side chain of the polymer, wherein a total number of the carbonate groups and the carboxylic acid halide groups is less than 150 per 1×10$^6$ main chain carbon atoms.

2. A fluorine-containing adhesive material comprising a fluorine-containing ethylenic polymer having a carbonate group and/or a carboxylic acid halide group at a chain end or a side chain of the polymer, wherein a total number of the carbonate groups and the carboxylic acid halide groups is less than 100 per 1×10$^6$ main chain carbon atoms.

3. The fluorine-containing adhesive material according to claim 1 or 2, wherein a number of carbonate groups at a chain end or a side chain of the polymer is at least 10 per 1×10$^6$ main chain carbon atoms.

4. The fluorine-containing adhesive material according to claim 1, wherein a number of carboxylic acid halide groups is at least 10 per 1×10$^6$ main chain carbon atoms.

5. The fluorine-containing adhesive material according to claim 1, which has the carbonate group and/or the carboxylic acid halide group at the polymer chain end.

6. The fluorine-containing adhesive material. according to claim 1, wherein a crystal melting point or a glass transition point of the fluorine-containing ethylenic polymer is at most 270° C.

7. The fluorine-containing adhesive material according to claim 1, wherein a crystal melting point or a glass transition point of the fluorine-containing ethylenic polymer is at most 230° C.

8. The fluorine containing adhesive material according to claim 1, wherein a crystal melting point or a glass transition point of the fluorine-containing ethylenic polymer is at most 210° C.

9. The fluorine-containing adhesive material according to anyone of claims 6 to 8, wherein the fluorine-containing ethylenic polymer is a copolymer comprising tetrafluoroethylene and ethylene.

10. The fluorine-containing adhesive material according to anyone of claims 6 to 8, wherein the fluorine-containing ethylenic polymer is a copolymer comprising tetrafluoroethylene and a monomer represented by the formula (i):

$$CF_2=CF-Rf^1 \qquad (i)$$

wherein RV$^1$ is CF$_3$ or ORf$^2$ (Rf$^2$ is a perfluoroalkyl group having 1 to 5 carbon atoms).

11. The fluorine-containing adhesive material according to claim 9, wherein the fluorine-containing ethylenic polymer having carbonate group and/or carboxylic acid halide group is a copolymer comprising 20 to 80% by mol of tetrafluoroethylene, 10 to 60% by mol of ethylene and 0 to 60% by mol of an ethylenic monomer copolymerizable with them.

12. The fluorine-containing adhesive material according to claim 11, wherein the ethylenic monomer copolymerizable with tetrafluoroethylene and ethylene is at least one selected from hexafluoropropylene, chlorotrifluoroethylene, a monomer represented by the formula (ii):

$$CH_2=CX^1(CF_2)_nX^2 \qquad (ii)$$

wherein X$^1$ is H or F, X$^2$ is H, F or Cl, and n is an integer of from 1 to 10, perfluoro(alkyl vinyl ethers), and propylene.

13. A laminate comprising:

(A) a layer comprising the fluorine-containing adhesive material according to claim 1, and (B) a layer comprising an organic material having a functional group exhibiting the affinity or reactivity with the carbonate group and/or carboxylic acid halide group.

14. The laminate according to claim 13, wherein the layer (B) comprises a polymer material having at least one functional group selected from a hydroxyl group, a carboxyl group, a carboxylic salt group, an ester group, a carbonate group, an amino group, an amide group, an imide group, a mercapto group, a thiolate group, a sulfonic acid group, a sulfonate salt group, a sulfonate ester group and an epoxy group in a molecular chain.

15. The laminate according to claim 13 or 14, wherein the layer (B) comprises a thermoplastic resin having a crystal melting point or a glass transition point of at most 270° C.

16. The laminate according to claims 15, wherein the layer (B) comprises a thermoplastic resin having a crystal melting point or a glass transition point of at most 230° C.

17. The laminate according to claim 13 or 14, wherein the layer (B) comprises a polymer material selected from polyamides, polyesters, polycarbonates, polyvinyl chlorides, polyacrylates, polyvinyl acetates, polyolefins, polyvinyl alcohols and ethylene/vinyl alcohol copolymers.

18. A multilayered tube or a multilayered hose obtainable by shaping the laminate according to claim 13.

19. A multilayered film or a multilayered sheet obtainable by shaping the laminate according to claim 13.

20. A tank obtainable by shaping the laminate according to claim 13.

21. A bottle obtainable by shaping the laminate according to claim 13.

22. A multilayered tube for fuel piping or a multilayered hose for fuel piping obtainable by shaping a laminate comprising:

(A) a layer comprising the fluorine-containing adhesive material according to claim 1, and (B) a layer comprising a polyamide which is an organic material having a functional group exhibiting the affinity or reactivity with the carbonate group and/or carboxylic acid halide group.

23. A fuel tank obtainable by shaping a laminate comprising:

(A) a layer comprising the fluorine-containing adhesive material according to claim 1, and (B) a layer comprising an ethylene polymer.

24. A bottle for liquid chemicals obtainable by shaping a laminate comprising:

(A) a layer comprising the fluorine-containing adhesive material according to claim 1, and (B) a layer comprising an ethylene polymer.

25. A process for manufacturing the shaped article according to claim 18, which is characterized by shaping (A) a fluorine-containing adhesive material comprising a fluorine-containing ethylenic polymer having carbonate group and/or carboxylic acid halide group and (B) an organic material having a functional group exhibiting the affinity or reactivity with the carbonate group and/or carboxylic acid halide group by melt coextrusion at a temperature, higher than a crystal melting point or glass transition point of each material.

26. The process according to claim 25, wherein (A) a fluorine-containing adhesive material comprising a fluorine-containing ethylenic polymer having a crystal melting point or glass transition point of at most 270° C., and (B) an organic material which is a thermoplastic resin having a crystal melting point or a glass transition point of at most 270° C., are shaped by melt coextrusion at a temperature in the range from a crystal melting point or glass transition point of each material to 350° C.

27. The process according to claim 25, wherein (A) a fluorine-containing adhesive material comprising a fluorine-containing ethylenic polymer having a crystal melting point or glass transition point of at most 230° C., and (B) an organic material which is a thermoplastic resin having a crystal melting point or a glass transition point of at most 230° C., are shaped by melt coextrusion at a temperature in the range from a crystal melting point or glass transition point of each material to 350° C.

28. The process according to claim 27, wherein the shaping temperature is at most 300° C.

29. A laminate comprising:

(A) a layer comprising the fluorine-containing adhesive material according to claim 1, and (B) a layer comprising an inorganic material.

30. The laminate according to claim 29, wherein the inorganic material in the layer (C) is a metal-based material.

31. The laminate according to 29, wherein the inorganic material in the layer (C) is a glass material.

32. A laminate having at least three layers, wherein (D) a layer comprising fluorine-containing ethylenic polymer free from carbonate group and/or carboxylic acid halide group is positioned on a side of (A) the layer comprising fluorine-containing adhesive material of the laminate according to claim 13 or 29.

33. A multilayered tube for fuel piping or a multilayered hose for fuel piping obtainable by shaping a laminate having at least three layers, comprising (D) a layer comprising fluorine-containing ethylenic polymer free from carbonate group and/or carboxylic acid halide group which is positioned on a side of (A) the layer comprising fluorine-containing adhesive material of the laminate according to claim 22.

34. A multilayered tube for fuel piping or a multilayered hose for fuel piping obtainable by shaping a laminate having at least three layers, comprising (E) a layer, comprising fluorine-containing ethylenic polymer having electrical conductivity which is positioned on a side of (A) the layer comprising fluorine-containing adhesive material of the laminate according to claim 22.

35. A multilayered tube for fuel piping or a multilayered hose for fuel piping obtainable by shaping a laminate having at least four layers, comprising (E) a layer comprising fluorine-containing ethylenic polymer having electrical conductivity is positioned on a side of (D) the layer comprising fluorine-containing adhesive material of the laminate according to claim 33.

36. A multilayered tube for fuel piping or a multilayered hose for fuel piping, obtainable by shaping a laminate having at least three layers, comprising (F) a protetive layer which is positioned on a side of (B) the layer comprising a polyamide of the laminate according to anyone of claims 22 and 33 to 35.

* * * * *